(12) United States Patent
Sirota et al.

(10) Patent No.: US 10,515,137 B1
(45) Date of Patent: Dec. 24, 2019

(54) SYSTEMS AND METHODS OF PROVIDING ENHANCED PRODUCT VISUALIZATION ON A GRAPHICAL DISPLAY

(71) Applicant: Loop Commerce, Inc., Menlo Park, CA (US)

(72) Inventors: Alex Sirota, Los Altos, CA (US); Maya Lotan, Los Altos, CA (US); Guy Dahan, Haifa (IL); Eduardo Fuhrken, San Jose, CA (US)

(73) Assignee: Loop Commerce, Inc., Menlo Park, CA (US)

( * ) Notice: Subject to any disclaimer, the term of this patent is extended or adjusted under 35 U.S.C. 154(b) by 0 days.

(21) Appl. No.: 14/823,159

(22) Filed: Aug. 11, 2015

Related U.S. Application Data

(60) Provisional application No. 62/035,702, filed on Aug. 11, 2014.

(51) Int. Cl.
| | |
|---|---|
| *G06F 3/00* | (2006.01) |
| *G06F 17/21* | (2006.01) |
| *G06F 17/22* | (2006.01) |
| *G06T 11/60* | (2006.01) |

(52) U.S. Cl.
CPC ........ *G06F 17/212* (2013.01); *G06F 17/2247* (2013.01); *G06T 11/60* (2013.01)

(58) Field of Classification Search
CPC ..... G06F 17/212; G06F 17/2247; G06F 11/60
See application file for complete search history.

(56) References Cited

U.S. PATENT DOCUMENTS

| | | | | |
|---|---|---|---|---|
| 6,686,926 | B1 * | 2/2004 | Kaye | G03B 35/16 345/680 |
| 8,078,969 | B2 * | 12/2011 | Harrison | G06F 3/04847 715/730 |
| 2007/0009182 | A1 * | 1/2007 | Yamauchi | G09G 5/397 382/302 |
| 2007/0064278 | A1 * | 3/2007 | Sugimoto | G11B 27/031 358/453 |
| 2008/0013120 | A1 * | 1/2008 | Ying | G06T 7/0004 358/1.12 |
| 2008/0046355 | A1 * | 2/2008 | Lo | G06Q 30/00 705/37 |
| 2013/0202220 | A1 * | 8/2013 | Takeshita | G06T 5/001 382/264 |
| 2014/0164159 | A1 * | 6/2014 | Lovelace | G06Q 30/0601 705/26.1 |

* cited by examiner

*Primary Examiner* — Kyle R Stork
(74) *Attorney, Agent, or Firm* — Polsinelli

(57) ABSTRACT

Systems and methods of providing enhanced product visualization on a graphical display include generating a visual frame having a first set of frame dimensions and comprising an inner border and an outer border; receiving a selection of a graphical object to be displayed at least within the outer border of the visual frame on the graphical display; identifying a set of object dimensions of the graphical object; determining an appropriate proportion between the set of frame dimensions and the set of object dimensions such that the graphical object is displayable at least within the outer border of the visual frame on the graphical display; manipulating the set of frame dimensions and/or the set of object dimensions such that the graphical object is displayable within the outer border of the visual frame; and displaying the graphical object at least within the outer border of the visual frame.

42 Claims, 24 Drawing Sheets

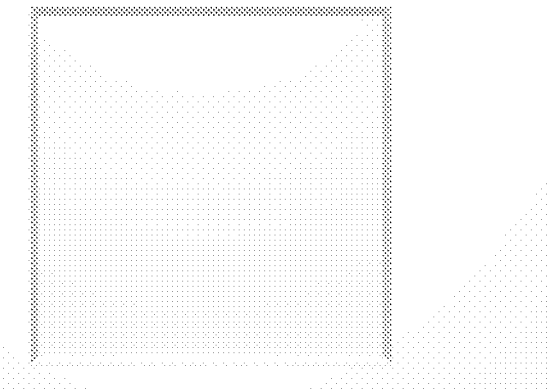
Fig. 12A (Base Box)
Fig. 12B (Internal Surface Image)
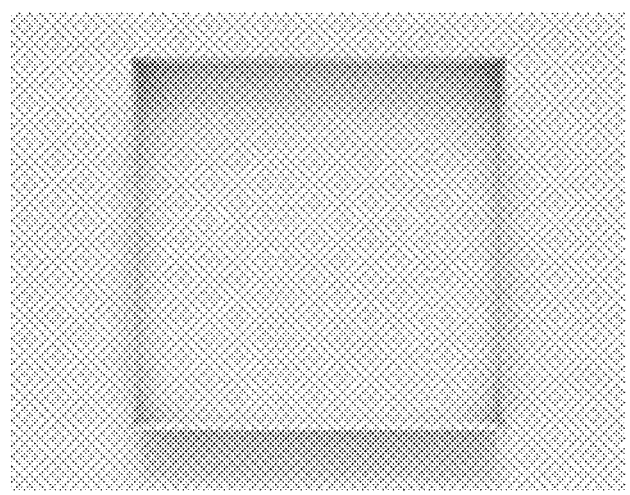
Fig. 12C (Shadow Layer)

SYSTEMS AND METHODS OF PROVIDING ENHANCED PRODUCT VISUALIZATION ON A GRAPHICAL DISPLAY

CROSS-REFERENCE TO RELATED APPLICATION

This application claims the benefit of U.S. Provisional Patent Application No. 62/035,702, filed on Aug. 11, 2014, which is incorporated in its entirety herein by reference.

BACKGROUND OF THE INVENTION

Currently, e-commerce sites and online stores typically provide images and photos of products in their catalogs. These images have various sizes, resolutions, backgrounds, compositions, etc. Single or multiple products are typically visualized online as a grid, list, or some other arrangement on the page of these product images, and potentially additional product metadata. For example, a product category view or a search results view in an online store typically shows a grid/table of products. Sites like Pinterest arrange the products and their images into a neat column view to make the presentation more desirable.

Presently available systems and methods of providing product visualization do not adequately give the viewer the ability to visualize one or more products (as a set) in a way that would make them appear highly designed and desirable, as if someone manually and carefully arranged them in real world. It is with respect to these and other considerations that the disclosure made herein is presented.

SUMMARY OF THE INVENTION

Technologies are presented herein in support of a system and method of providing enhanced product visualization on a graphical display.

According to a first example aspect of the invention, a method of providing enhanced product visualization on a graphical display is disclosed. The method may be performed by a computer, the computer having a memory, a processor, and one or more code sets stored in the memory and executable in the processor. The method may include such steps as creating or generating, by the processor, on the graphical display, a visual frame having a first set of frame dimensions and comprising an inner border and an outer border; receiving, at the processor, a selection of a first graphical object to be displayed at least within the outer border of the visual frame on the graphical display; identifying, by the processor, a first set of object dimensions of the first graphical object; determining, by the processor, an appropriate proportion between the first set of frame dimensions and the first set of object dimensions such that the first graphical object is displayable at least within the outer border of the visual frame on the graphical display; based on the determining, manipulating, by the processor, at least one of the first set of frame dimensions and the first set of object dimensions such that the first graphical object is displayable at least within the outer border of the visual frame on the graphical display; and displaying, by the processor, the first graphical object at least within the outer border of the visual frame on the graphical display.

In some embodiments, the first graphical object may include at least one of an image, a video, a document, and text dialog box. In some embodiments, the method may further include such steps as receiving, at the processor, a selection of a second graphical object to be displayed at least within the outer border of the visual frame on the graphical display; identifying, by the processor, a first set of object dimensions of the second graphical object; dividing, by the processor, an area bounded by the inner border of the visual frame, based on the total number of graphical objects, into a plurality of sub-areas within the visual frame; manipulating, by the processor, the respective dimensions of one or more of the visual frame, the first graphical object, and the second graphical object, such that each graphical object may be displayed in an individual sub-area of the plurality of sub-areas within the visual frame; and displaying, by the processor, the first graphical object and the second graphical object in the individual sub-areas of the plurality of sub-areas within the visual frame on the graphical display.

In yet further embodiments, additional steps may be performed such as generating, by the processor, one or more graphical separators between each of the plurality of sub-areas within the visual frame on the graphical display; and centering each of the first graphical object and the second graphical object in its respective sub-area. In some embodiments of the method, the plurality of sub-areas have equal dimensions. In some embodiments, the plurality of sub-areas have unequal dimensions. In some embodiments, determining may include determining, by the processor, the appropriate proportion between the first set of visual frame dimensions and the first set of object dimensions such that the dimensions of the first graphical object exceed an area bounded by the inner border of the visual frame. In further embodiments, the visual frame may include one of a square shape, a rectangular shape, a circular shape and an oval shape.

According to a second example aspect of the invention, a system on which the methods described may be implemented is also disclosed. These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Embodiments of the invention are illustrated by way of example and not limitation in the figures of the accompanying drawings, in which like reference numerals indicate corresponding, analogous or similar elements, and in which:

FIGS. 12A-C show an example simulation of the internal surface of a box according to at least one embodiment of the invention;

Figure 1:
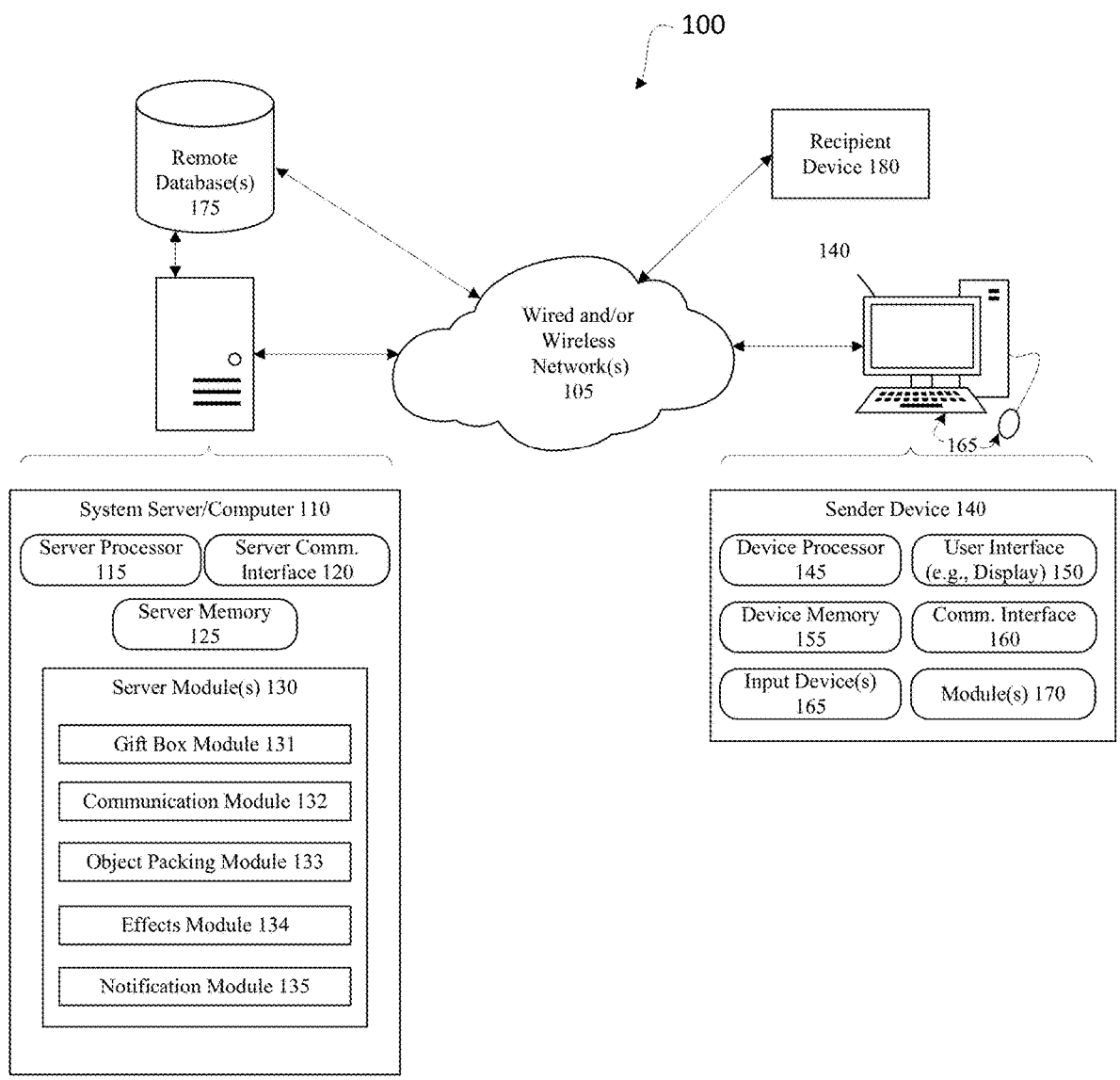
FIG. 1 is a high level diagram illustrating an example configuration of a system for or in support of providing enhanced product visualization on a graphical display, according to at least one embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

By way of overview and introduction, various systems and methods are described herein that facilitate the ability to visually represent an item or object (e.g., product) to be purchased (e.g., as a gift) alone or with one or more other products, on a graphical display. As described herein, the systems and methods allow a user to select one or more items to be displayed in an enhanced visual representation of a gift box, which may then be provided to a recipient via any number of standard electronic communication protocols (e-mail, SMS, Instant Message, social media platform, etc.).

Among the various embodiments as described herein, one or more of the following considerations may be accounted for by in providing the enhanced visual representation. Various embodiments may include different or other benefits, and some embodiments need not include benefits discussed herein:

That in some embodiments a gift and the product(s) it comprises may look visually beautiful, carefully arranged, pseudo-realistic, and/or highly desirable to the gift sender and/or the gift recipient.

That in some embodiments a high level of visualization may be generally needed to achieve a high level of customizability and personalization—both by stores and their users/customers.

That in some embodiments the method of visualization may be effective on a variety of product images, without the system having any control over the dimensions, backgrounds, subjects, of the various images, etc.

That in some embodiments the visualization may be dynamic—meaning that it may be created programmatically and/or 'on-the-fly' based on techniques like HTML, Cascading Style Sheets (CSS), JavaScript, and/or other similar programming languages—with any given set of products and/or any given customization.

That in some embodiments the visualization may accommodate additional components, such as backgrounds, greeting cards, animations, videos, photographs, music, (virtual) tissue paper etc.

That in some embodiments the visualization may be scalable, e.g., to accommodate various virtual container/packaging sizes, display screens, devices like mobile, tablet, desktop etc. It is noted that the systems and methods described herein are necessarily rooted in computer technology to overcome a problem specifically arising in graphical user interfaces.

Turning now to FIG. 1, the schematic block diagram illustrates a distributed network system 100 including network 105, which may comprise the Internet, one or more telephony networks, one or more network segments including local area networks (LAN) and wide area networks (WAN), one or more wireless networks, or a combination thereof. System 100 also includes a system server/computer 110 constructed in accordance with one or more implementations of the invention. In some embodiments, system server 110 may be a stand-alone computer system. In other embodiments, system server 110 may communicate over network 105 with multiple other processing machines such as computers, and more specifically stationary devices, mobile devices, and computer servers (collectively, "computing devices"). Communication with these computing devices may be either direct or indirect through further machines that are accessible to the network 105.

System server 110 may be any suitable computing device and/or data processing apparatus capable of communicating with computing devices, and other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

As described further below, among the computing devices on or connected to the network 105 may be user devices which may include sender device 140 and recipient device 180. Recipient device 180 may have components such as a processor, memory, etc., such as described with respect to device 140. As understood herein, in accordance with one or more embodiments, a computing device may be a stationary computing device, such as a desktop computer, kiosk and/or other machine, each of which generally has one or more processors configured to execute code to implement a variety of functions, a computer-readable memory, one or more input devices, one or more output devices, and a communication port for connecting to the network 105. Typical input devices may include a keyboard, pointing device (e.g., mouse or digitized stylus), a web-camera, and/or a touch-sensitive display, etc.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, system server 110 may include a server processor 115 which is operatively connected to various hardware and software components that serve to enable operation of the system 100. Server processor 115 serves to execute instructions to perform various operations relating to security and transmission processing as will be described in greater detail below. Server processor 115 may be one or a number of processors, a central processing unit (CPU), a graphics processing unit (GPU), a multi-processor core, or any other type of processor, depending on the particular implementation. System server 110 may be configured to communicate via communication interface 120 with various other devices connected to network 105. Preferably, communication interface 120 may include but is not limited to, a modem, a Network Interface Card (NIC), an integrated network interface, a radio frequency transmitter/receiver (e.g., Bluetooth, cellular, Near Field Communication), a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such a code, stored in the memory and/or storage in the form of one or more software modules 130, each module representing one or more code sets. The software modules 130 may comprise one or more software programs or applications (collectively referred to as the "server application") having computer program code or a set of instructions executed in the processor 115 for carrying out operations for aspects of the systems and methods disclosed herein, and may be written in any combination of one or more programming languages. As shown in FIG. 1, the exemplary software modules may include a gift box module 131, a communication module 132, an object packing module 133, an effects module 134, and a notification module 135. It should be noted that in accordance with various embodiments of the invention, server modules 130 may execute entirely on system server 110 as a stand-alone software package, partly on system server 110 and partly on the computing devices 140 and/or 180, or entirely on devices 140 and/or 180.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more remote database(s) 175, either directly or via network 105. Remote database 175 may comprise any of the memory configurations as described above, and is in direct or indirect communication with system server 110. Remote database 175 may be a database belonging to another system, such as a product inventory database, image database, etc.

As shown in FIG. 1, a typical computing device, for example sender device 140, includes various hardware and software components that serve to enable operation of the system 100, including one or more device processors 145, a user interface 150, a device memory 155, a communication interface 160, one or more input devices 165, and one or more software modules 170. As with server processor 115, device processor 145 may be a number of processors, a central processing unit (CPU), a graphics processing unit (GPU), a multi-processor core, or any other type of processor, depending on the particular implementation. Likewise, device memory 155 is accessible by device processor 145, thereby enabling the processor to receive and execute instructions encoded in the memory so as to cause the computing device and its various hardware components to carry out operations for aspects of the exemplary systems and methods disclosed herein. Device memory 155 may comprise one or more of the memory configurations as described above with reference to server memory 125.

User interface 150 is also operatively connected to device processor 145. User interface 150 may comprise a display and/or graphical inputs displayed thereon, which may serve to facilitate both the providing of information to a user and as an input device, depending on the particular hardware and software. User interface 150 may include an input device such as a touch-screen, mouse, stylus, etc. Input may be provided by a user for example by "clicking" on a display using a mouse; when used herein "clicking" by a user may include other inputs such as using a touch screen. Communication interface 160 is also operatively connected to the device processor 145 and may be any interface that enables communication between the computing device and external devices, machines and/or elements. As with the server communication interface 120, the device communication interface 160 may include but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device to communication interface 120 of system server 110 and/or other computing devices and/or communication networks such as private networks and the Internet. Such connections may include a wired connection or a wireless connection (e.g., using the 802.11 standard), though the communication interface may be practically any interface that enables communication to/from the computing device.

Also connected to the device processor 145 may be one or more input and/or output device(s) 165, such as switch(es), button(s), key(s), a touch-screen, microphone, etc., as would be understood in the art of electronic computing devices. Input devices 165, which may be used in conjunction with user interface 160 or on their own, serve to capture commands and/or actions from the user such as on-off commands, user-provided information, settings adjustments, and/or any relevant user interaction with the computing device related to operation of the system 100.

The one or more device modules 170 are encoded in the memory 155 of the computing device. The software modules may comprise one or more software programs or applications having computer program code or a set of instructions (collectively referred to as the "client application") executed in device processor 145. Such computer program code or instructions configure device processor 145 to carry out operations of the embodiments disclosed herein and may be written in any language or combination of one or more programming languages. It should be noted that in accordance with embodiments of the invention, device modules 170 may execute entirely on computing devices 140 and/or 180 as a stand-alone software package, partly on the computing device and partly on system server 110, or entirely on system server 110.

It should also be noted that while in FIG. 1, the two computing devices 140 and 180 are designated as a "sender device" and a "recipient device" respectively, the computing devices do not necessarily have to belong to the sender and/or the recipient; rather, these designations simply indicate the respective user's ability to access and use the computing device in accordance with embodiments of the invention.

Figure 2:
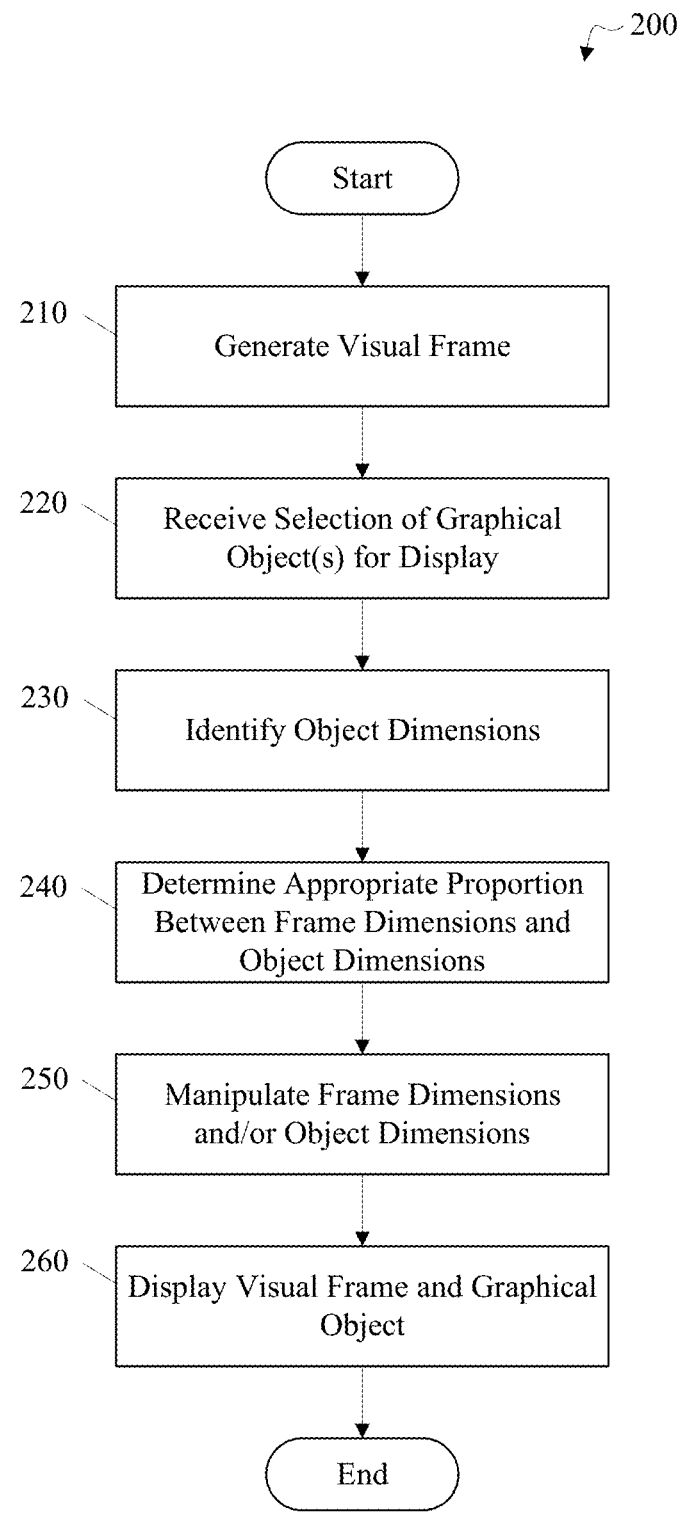
FIG. 2 is a schematic flow diagram illustrating a method for or in support of providing enhanced product visualization on a graphical display according to at least one embodiment of the invention.

Turning to FIG. 2, a detailed flow diagram illustrating elements of a method 200 of providing enhanced product visualization on a graphical display according to embodiments of the invention is provided. While method 200 is described herein as being performed on system 100, in some embodiments, method 200 may be performed on any computer (e.g., system server 110) having a processor (e.g., server processor 115), memory (e.g., server memory 125), and one or more code sets or software (e.g., server module(s) 130) stored in the memory and executing in or executed by the processor.

Figure 3A:
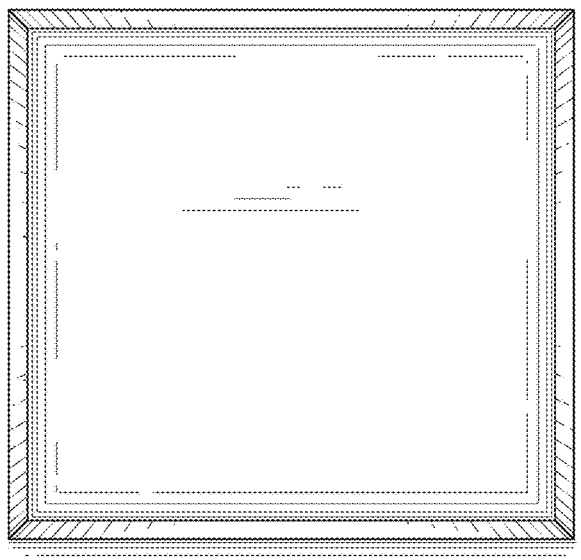
FIGS. 3A-F are example visual frames according to various embodiments of the invention.

Method 200 according to at least one embodiment starts at step 202 when system server 110, using server processor 115, which is configured by executing one or more software modules 130, including, preferably, gift box module 131, creates or generates a visual frame having a first set of frame dimensions and comprising an inner border and an outer border, on the graphical display. Frame dimensions are typically understood to be horizontal (e.g., having an x-coordinate) and vertical (e.g., having a y-coordinate) for a rectangular frame, but in other embodiments may be other dimensions (and/or shapes) or other numbers of dimensions as well. An exemplary visual frame in shown in FIG. 3A.

To generate the visual frame, in some embodiments, a visualization is done via a virtual "gift box." In some embodiments, a gift box may be a two-dimensional ("2-D") image, e.g., with three-dimensional ("3-D") appearance, due to the appropriate shading and geometry. In it may be 'packed', placed, or overlain 2-D product images (which in some embodiments the system may have no control or editing ability over) in a way that may look seamless, as described herein. By providing a top view of the 3-D box, in some embodiments the 2-D images may be neatly placed 'inside' using programmatic techniques (for example, HTML, CSS, or JavaScript). As explained herein, in some example embodiments, a high resolution version of a box, e.g., having square dimensions, may be created and modified accordingly.

At step 220, system server 110, using server processor 115, which is configured by executing one or more software modules 130, including, preferably, communication module 132, may receive a selection (e.g. from a user operating a remote user computer such as sender device 140) of a first graphical object to be displayed within the visual frame on the display. In some embodiments, an object may be displayed within a visual frame or box, for example, when the bounds of the object are smaller than and/or may be confined within the bounds or size of the internal part of the frame or box. A graphical object as understood herein may be any object (e.g., content) visibly displayable on a graphical user interface and/or graphical display. For example, in some embodiments a graphical object may be a static image or shape, an animated graphic (e.g., a .gif), a video, a text dialog box, a document, or any portion thereof, etc. A graphical object may be for example an image of a product, e.g., a shirt, shoe, book, gift, etc. The selection may be, for example, a selection made by a user on the user's device 140, indicating that the user would like to see a visualization of a particular product in the visual frame "gift box."

As explained herein, in some embodiments the visual frame and/or the graphical object may be manipulated or modified as necessary, depending on the desired effect. In some embodiments, a processor, such as server processor 115, may first calculate overall bounding box dimensions for a top level frame or container (for example, a browser window, a panel within a web page, etc.) in which the visual frame and/or the graphical object are to be displayed. The calculation of the frame dimensions may be optimized, for example, to maximize overall frame size within the visual frame's container, to maximize the visual frame size, e.g., taking into account object shapes or aspect ratios, etc. For example, if a maximal frame shape is a large rectangle, but the graphical object is square, in some embodiments, the system may be configured to use the maximal height while making the width narrower, so as to make the frame square in shape and better accommodate the inner square object. In some embodiments, once the optimal dimensions of the visual frame are calculated, e.g., based on both its container and contents (objects), the objects may then be optimally sized within the frame and placed within the visual frame as described herein.

At step 230, system server 110, using server processor 115, which is configured, e.g., by executing one or more software modules 130, including, preferably, gift box module 131, may identify a first set of object dimensions of the first graphical object. In accordance with various embodiments of the invention, the dimensions of a graphical object and/or the visual frame may be understood to be any form of measurement with relation to the relative size of the item as it appears when generated (e.g. displayed) on a visual display, including the length, width, height, and/or depth. For example, a dimension of an object such as a frame or a graphical object may be a length and width and depth, or if an irregular object is used the outer boundaries or limits of the object may be used.

In some embodiments such dimensions may be provided or measured in standard or real world measurements such as inches or centimeters, and/or may be provided as a pixel count indicating the number of pixels in any direction or in the total area covered by the object, and/or, or in an abstract unit used by an embodiment of the invention. Of course, the dimensions of a graphical object representing a physical object are often not to size, and aspect ratios are often changed. As such the system in at least one embodiment may be primarily concerned with the dimensions of the graphical object as they relate to the display on which the graphical object is to be displayed and/or the dimensions relative to other objects or images to be displayed. Furthermore, in some embodiments, some objects, such as the visual frame, may have inner borders defined by inner frame dimensions, and outer borders defined by outer frame dimensions. Of course, other shapes are also contemplated.

At step 240, system server 110, using server processor 115, which is configured, e.g., by executing one or more software modules 130, including, preferably, gift box module 131, may determine or calculate an appropriate proportion, ratio and/or relationship between the first set of frame dimensions and the first set of object dimensions, e.g., such that the first graphical object is displayable at least within the outer border of the visual frame on the graphical display. As understood herein, an 'appropriate' proportion may refer to a proportion that is suitable or proper in the circumstances. For example, in some embodiments, a processor, such as server processor 115, may implement a "scale-to-fit" algorithm for placing and sizing objects, in which the graphical object is rendered in maximal size and dimensions which would fit inside its visual frame. In some embodiments, the processor may implement a "fit with padding" algorithm in which the processor may optionally be configured to add vertical and/or horizontal padding if needed. In some embodiments, the processor may be configured to calculate the aspect ratio of the graphical object and the visual frame and compare between the two. If the aspect ratio of the graphical object is larger than that of the visual frame, the width dimension may be maximized and the height may be adjusted according to the original aspect ratio of the visual frame. Otherwise, the height dimension may be maximized and the width may be adjusted accordingly.

Therefore, in determining the appropriate proportion, in some embodiments the system may take into consideration, for example, the size of the screen, container, and/or display area on which the visual frame and graphical object are to be displayed, the device on which they are to be displayed, the colors, contrast, and/or shadings of the visible frame and graphical object, etc., in addition to the initial dimensions. In some embodiments, the system may be configured to detect the specific object and/or object shape being represented in by the graphical object, using, for example, shape recognition software. Such information may be used, for example, to determine orientation of the graphical object, which may impact manipulation of the dimensions.

In some embodiments, based on the determination in step 240, at step 250, system server 110, using server processor 115, which is configured, e.g., by executing one or more software modules 130, including, preferably, gift box module 131, may modify, manipulate or calculate the first set of frame dimensions and/or the first set of object dimensions such that the first graphical object is displayable at least within the outer border of the visual frame on the graphical display. In some embodiments, based on the determination in step 240, at step 250, system server 110, using server processor 115, which is configured, e.g., by executing one or more software modules 130, including, preferably, gift box module 131, may modify, at least one of the first set of frame dimensions and the first set of object dimensions, e.g., to comply with the first proportion between the first set of frame dimensions and the first set of object dimensions. In some embodiments, the manipulation may be performed, for example, such that the first graphical object is displayable at least within the outer border of the visual frame on the graphical display.

Figure 3B:
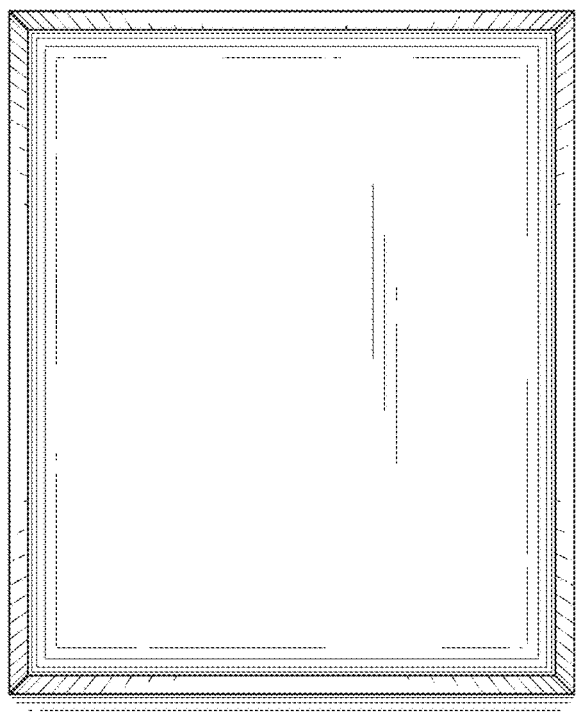
Figure 3C:
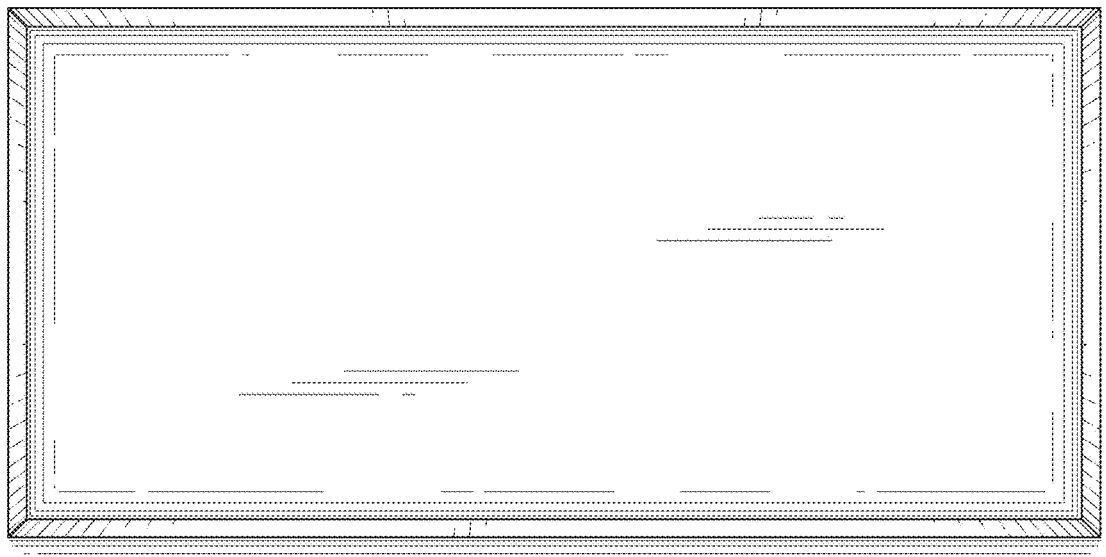
Figures 3D, 3E:
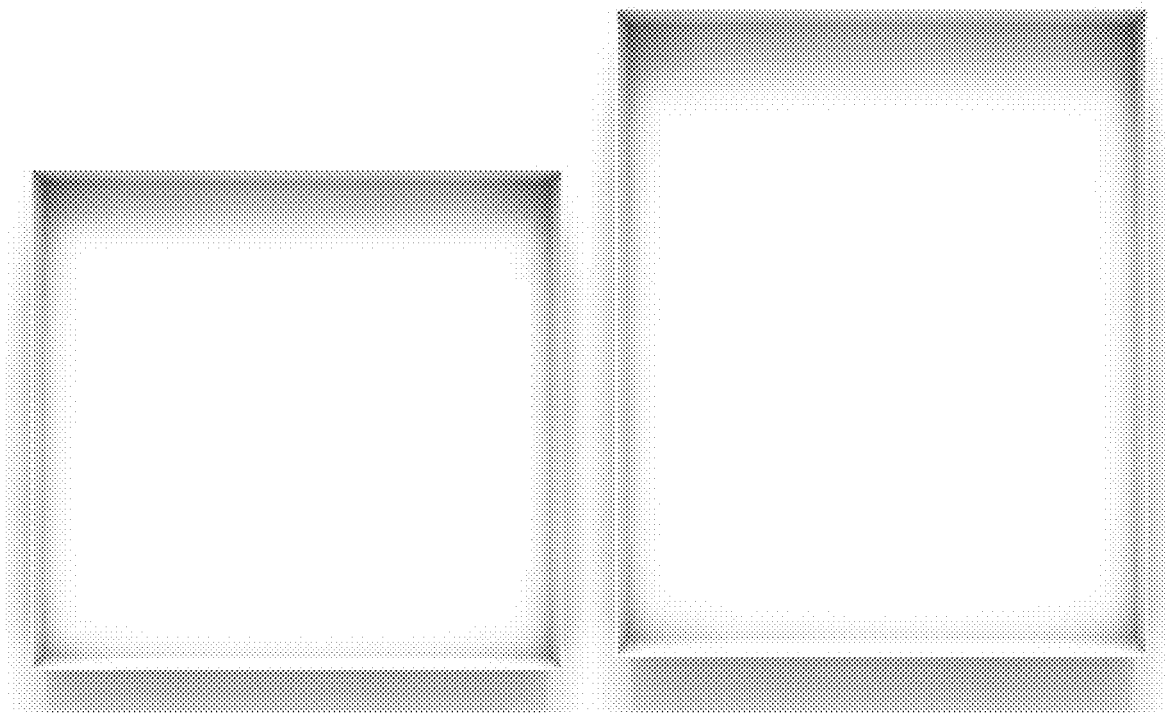
Figure 3F:

As may be seen in FIGS. 3B-C, in some embodiments the original square box may be crafted visually in a way that stretching and/or resizing it horizontally and/or vertically to achieve any proportions and dimensions may create a visually enhanced box, e.g., with no visual artifacts and/or none of the stretching visible. Of course, it will be understood by those of ordinary skill in the art that in stretching, manipulating, resizing, and/or adjusting the visual frame (and/or graphical objects) to make it a desired aspect ratio and/or size, the processor may also reduce the size (e.g., make things smaller, and not only larger). By using, e.g., high resolution images of the visual frame and/or graphical object, making one or both smaller may not reduce image quality. For example, FIGS. 3D-F show embodiments of FIGS. 3A-C respectively in which a high resolution image of the visual frame was generated in various sizes.

In some embodiments, stretching is accomplished by the system implementing front-end JavaScript code which may first determine the dimension of a containing area (also referred to as a container) for the box depending on the context of the application/screen/dialog box and/or the user screen—for example, in some embodiments, the container may be centered on the web page, or could be the left side of a system-generated dialog box, etc. The container could have landscape or portrait proportions and depending on whether the box is being generated on a mobile device, in a web browser, etc., the container may have different pixel dimensions. Once the size of the container is determined depending on the application, in some embodiments the JavaScript code logic may calculate and modify the dimensions of or stretch the box to fit the container (possibly adding some padding/margins etc.). In some embodiments, stretching may be done for example by JavaScript instructing the browser to stretch the underlying box image asset. As with other embodiments disclosed herein, while certain languages and certain named parameters are used, other embodiments may use other languages and other parameters.

Figure 4A:
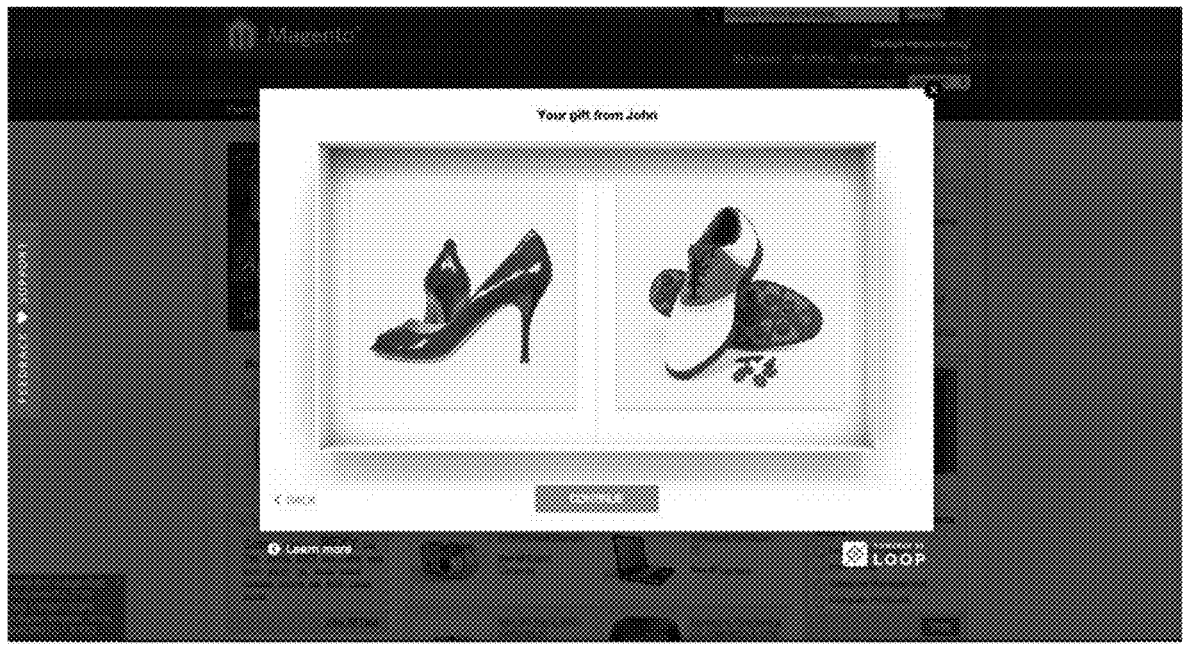
FIGS. 4A-D are example system dialog boxes according to various embodiments of the invention.

In some embodiments, depending on the screen on which the box is being rendered the size of the container may be determined, for example, using the following calculations:

As may be seen in the example of FIG. 4A, if a system dialog box has a constant size, for example DIALOG_W× DIALOG_H and the dialog/screen design calls for the box to have landscape orientation—the calculation executed by the system may be, for example, the following (in which the order may be different): 1. Place the dialog title panel (HTML DIV) having the size outlined in the design (TITLE_ HEIGHT); 2. Place the box container (HTML DIV) having the size outlined in the design (BOX_ HEIGHT); 3. Place the bottom button panel (HTML DW) having the size outlined in the design (BUTTON_HEIGHT); 4. Calculate the height of the box by BOX_HEIGHT=DIALOG_H-TITLE-HEIGHT-BUTTON_ HEIGHT; 5. Calculate the width of the box by subtracting left and right margins outlined in the design from DIA- LOG_W resulting in BOX_WIDTH; and 6. Once the dimensions of the box are calculated in JavaScript the box may be scaled and rendered in JavaScript using correct dimensions.

Figure 4B:
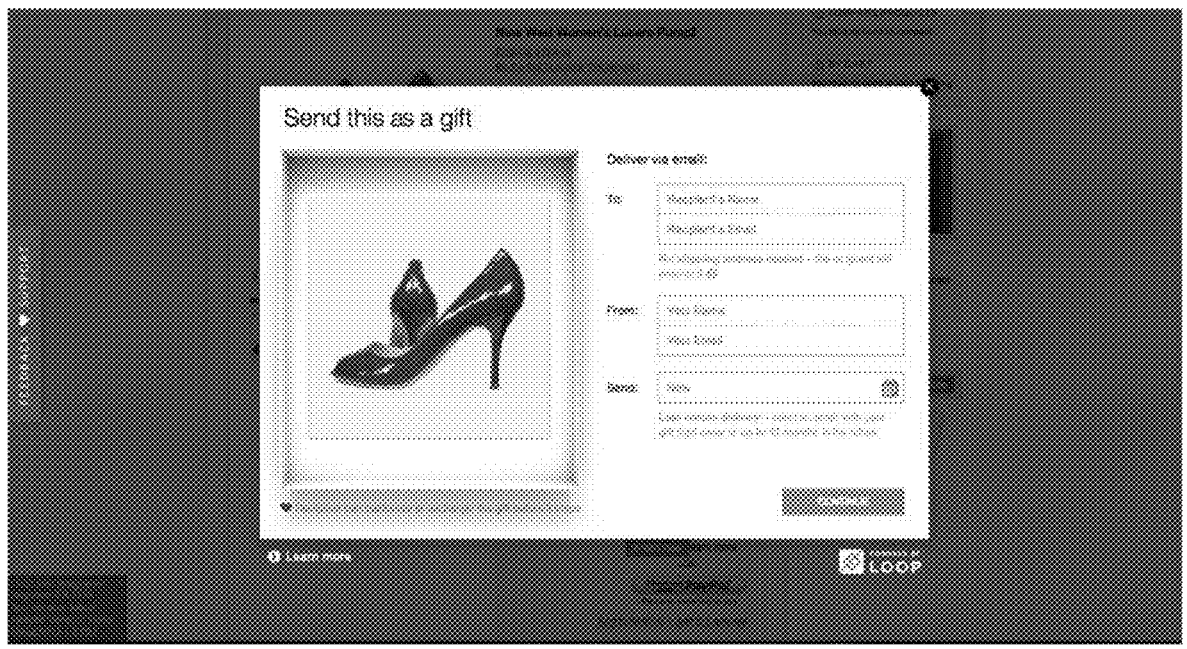
Figure 4C:
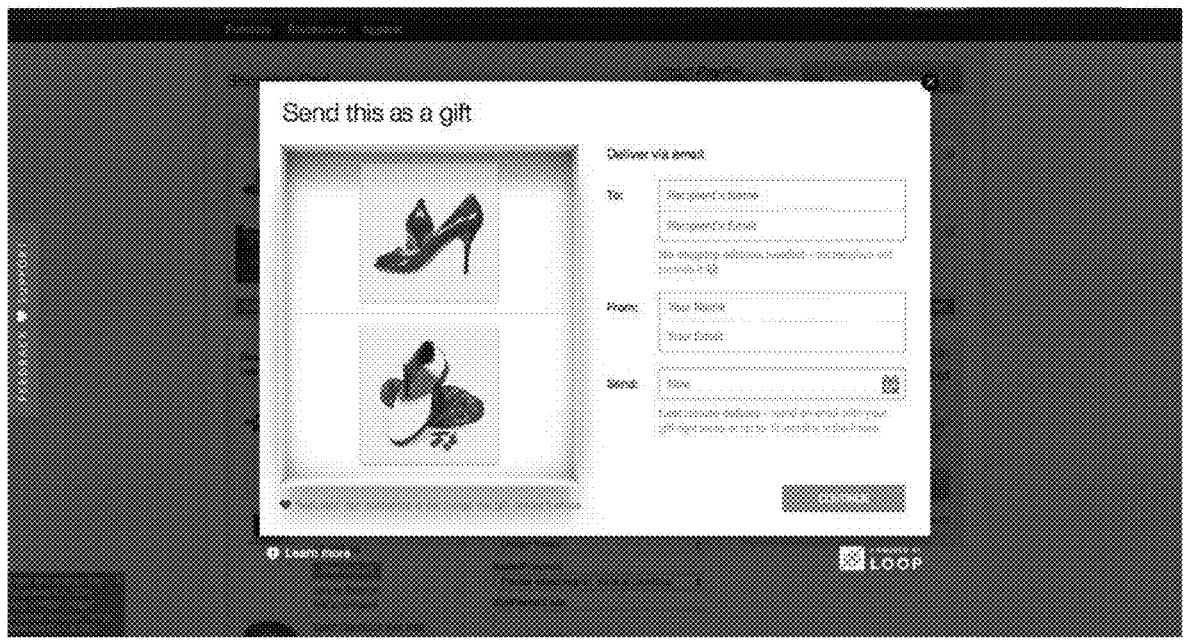
Figure 4D:
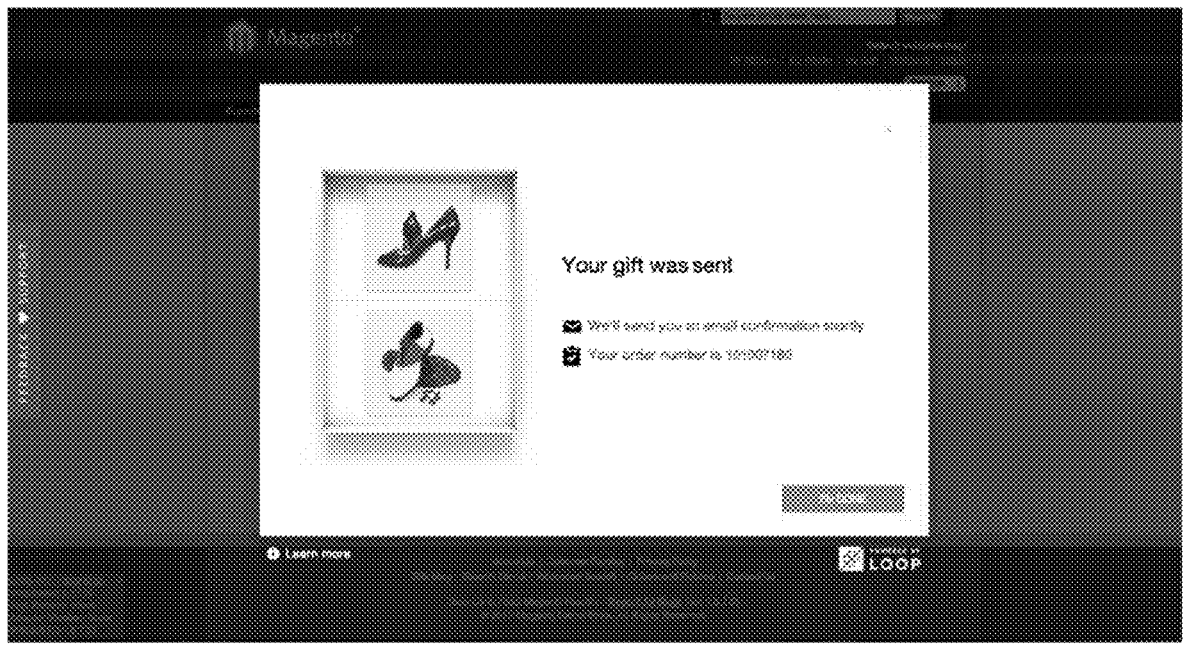

Similarly, in some embodiments, as may be seen in the example of FIGS. 4B-D, when the dialog size is constant, the system design may call for constant positioning and sizing of the box, and the system (e.g., using JavaScript) may use the values from the design to position and size the box, e.g., without any need to read the device and/or measure the screen size, etc. For example, in examples in which the dialog and box of FIG. 4A are to span the entire screen, in some embodiments the system may implement a set of operations such as the following (in which the order may be different): 1. Measure the dimensions of the user's monitor; 2. Apply pre-defined margins (for example, 5% of screen width/height) to calculate the dialog size from screen size and margin size; 3. Render the container dialog, centered vertically and horizontally on the screen and having the dimensions calculated in step 2; 4. Calculate the size of the box—taking as an input the dimensions of the dialog from step 2, the system may apply pre-defined margins (for example, 20 pixels in each direction) to calculate the box size; and 5. Render the box centered vertically and horizontally within the dialog using the calculated size.

In some embodiments, once the dimensions have been calculated, the system may execute code to perform the stretching algorithm, for example, as follows: 1. If the container box (HTML DW) size was calculated, the system may calculate position and dimensions, e.g., by inspecting the container box CSS/HTML properties—JavaScript may call a JS library (for example JQuery) library function to get the container width( ), height( ) and position; and 2. An algorithm according to embodiments may retrieve the box target width, size, left and top coordinates from system memory if these were calculated previously and stored therein. In some embodiments, once the code (e.g., JavaScript) has the width, height, left, and top, it may render the base box image and other assets using, for example, the following operations (in which the order may be different): 1. Render the HTML image element (<IMG>); 2. Set the image HTML element top and left coordinates, which may position it at the right place; 3. Set the image HTML element width and height attributes, which may stretch the image to correct target dimensions; and 4. The browser may look at IMG elements width and height and stretch the image correctly (e.g., appropriately) using its internal algorithms (typically bicubic or other interpolation).

Figure 5A:
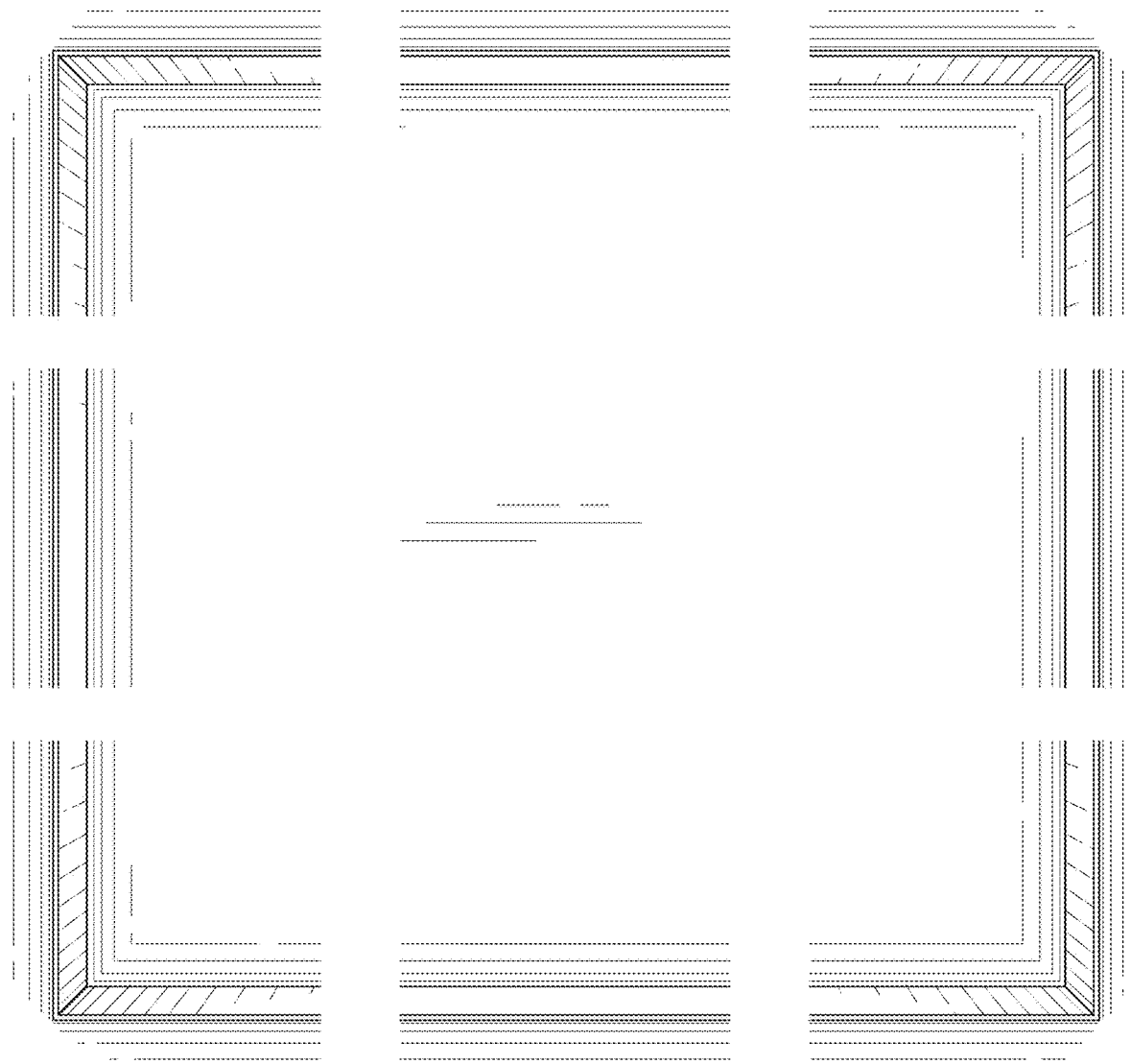
FIG. 5A is an example of a frame created using multiple images, according to at least one embodiment of the invention.
Figure 5B:
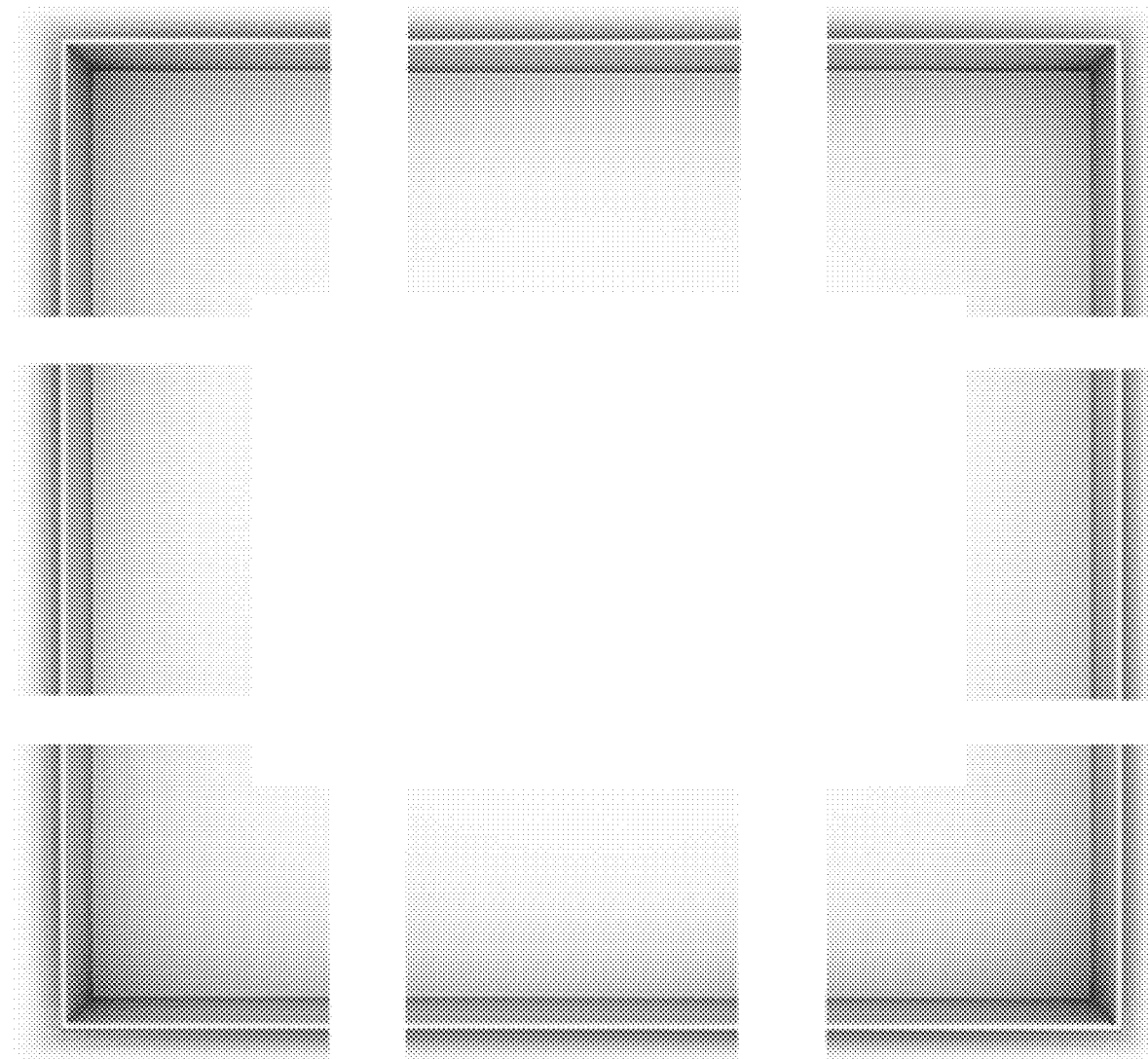
FIG. 5B is an example of a higher fidelity and more realistic frame created using multiple images, according to at least one embodiment of the invention.

In accordance with other embodiments of the invention, other methods of manipulating the visual frame dimensions are also provided. For example, turning briefly to FIG. 5A, an example of a frame created using multiple images is shown according to at least one embodiment of the invention. As another example, turning now briefly to FIG. 5B, an embodiment which produces higher fidelity or more realistic results is shown. In this embodiment a system creates multiple images (in this case, nine images) for multiple segments of the box (in this case, nine segments —four corners, four sides and the middle). Then the corners may be rendered 'as-is', the sides may be stretched, resized or tiled (vertically or horizontally, depending on the side), and/or the center image may be tiled and repeated in both directions, and/or stretched, etc.

Finally, at step 260, system server 110, using server processor 115, which is configured, e.g., by executing one or more software modules 130, including, preferably, packing module 133, may display, by the processor, the first graphical object at least within the outer border of the visual frame on the graphical display.

Figure 6:
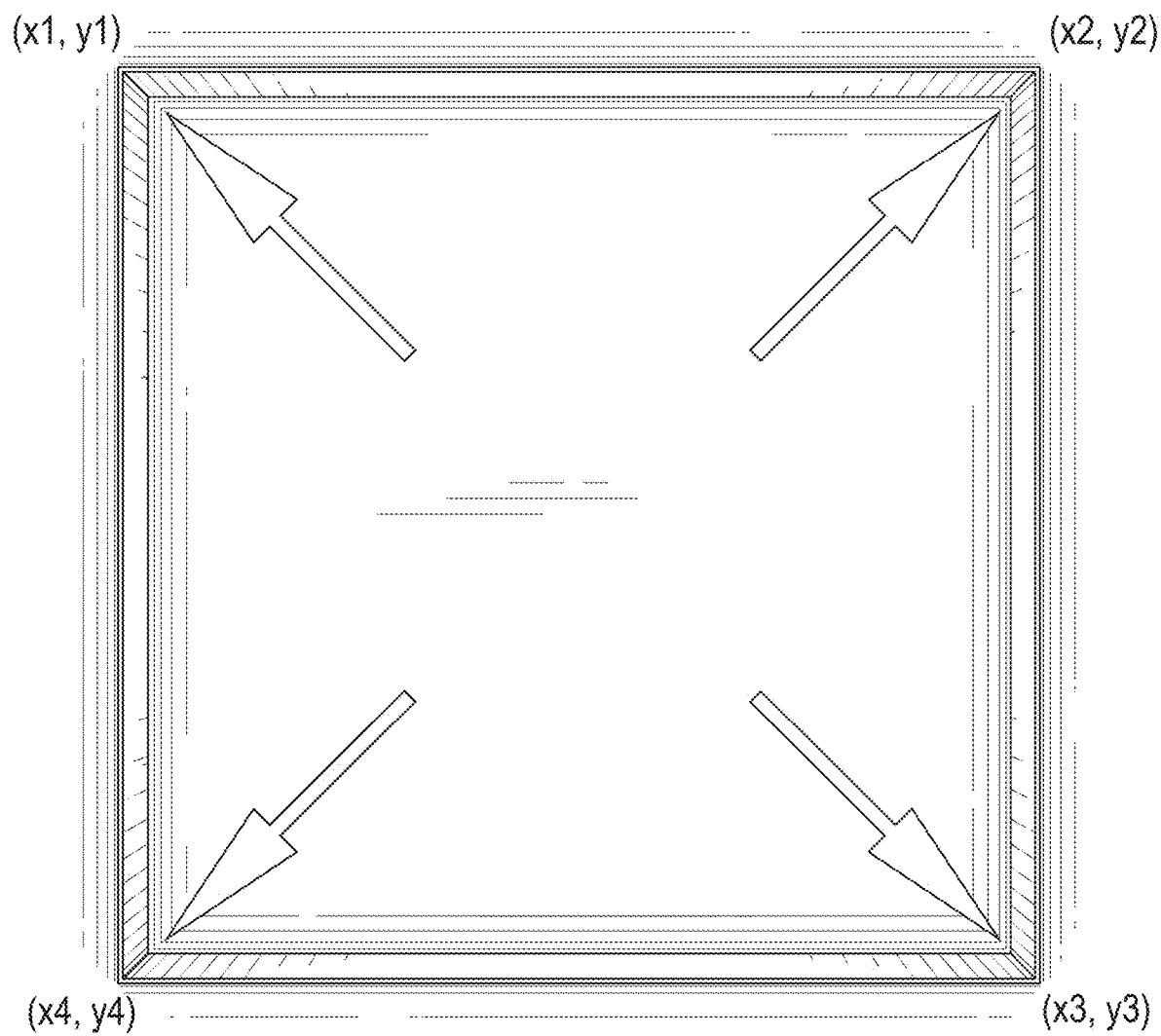
FIG. 6 is an example frame containing bounding coordinates of the inside of the box according to at least one embodiment of the invention.
Figure 7:
FIG. 7 is an example of a perfect (accurate) placement of any object 'inside' a box, according to at least one embodiment of the invention.

Turning now briefly to FIG. 6, in some embodiments, in order to be able to place external layers, images, videos, and/or other objects and/or media inside the box, there is in some embodiments a need to be able to accurately calculate the bounding coordinates of the inside of the box, so every externally placed object seems to be perfectly placed inside the box. In order to achieve this, one embodiment includes, for example: for each box, the system may be configured to associate a number of coordinates with defined points on the visual frame (and/or the graphical object), such as the four coordinates indicated in FIG. 6. Then, when the box is stretched and/or resized, the system may record the stretching coefficients (e.g., Stretch_X, Stretch_Y). Then, in some embodiments, for each of the designated coordinates, the system may calculate the resulting coordinates, e.g., by multiplying each coordinate by the stretch coefficients. The result may be perfect (accurate, appropriate, etc.) placement of any object 'inside' the box, as shown in FIG. 7.

Figure 8:
FIG. 8 is an example of any object shown at a perceived depth in a box, according to at least one embodiment of the invention.
Figure 9A:
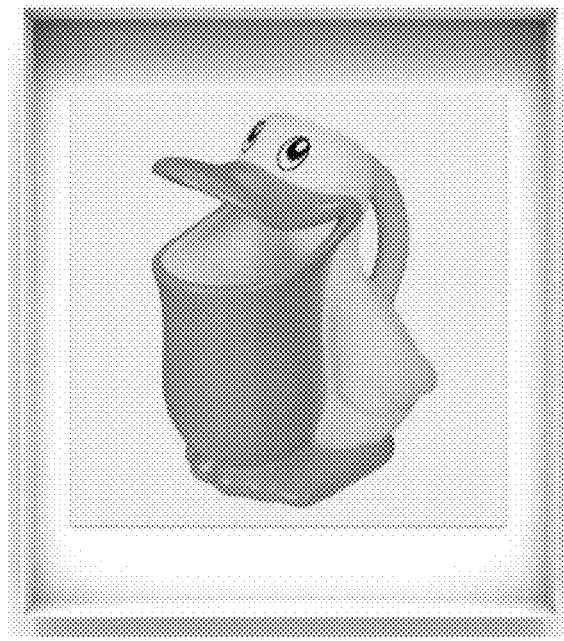
FIGS. 9A-E show example results of implementation of a "bento box" algorithm, according various embodiments of the invention.
Figure 9B:
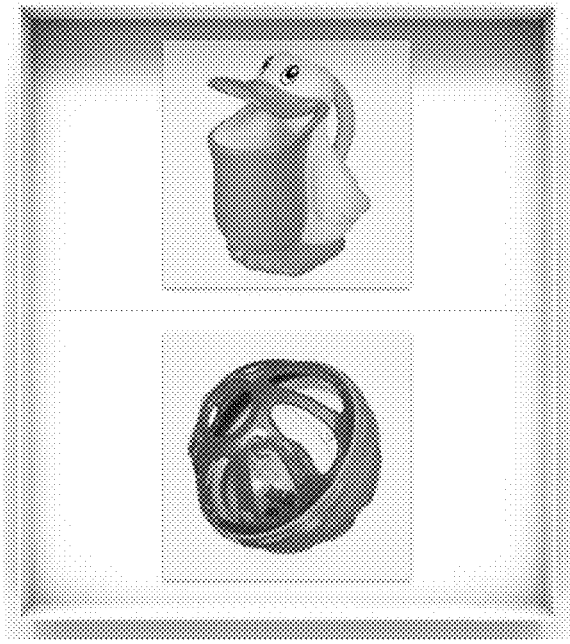
Figure 9C:
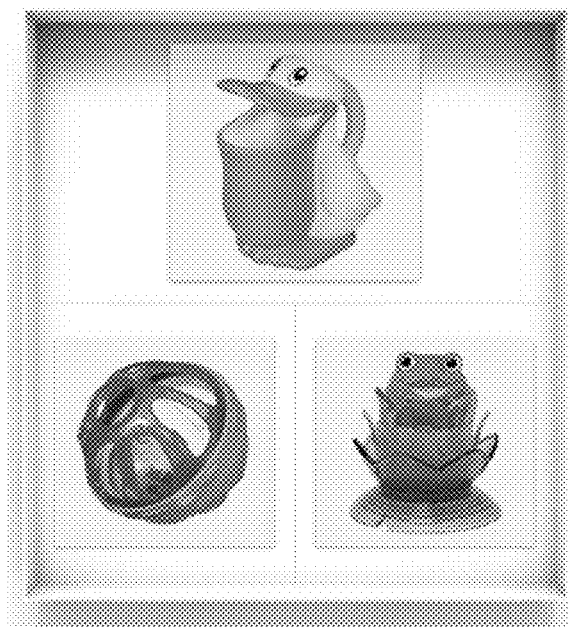
Figure 9D:
Figure 9E:

Furthermore, in some embodiments, the system may be configured to provide the perception of depth. A similar technique to calculating the placement of the 'bottom' of the box may be implemented by the system in order to be able to place an object at what appears to be (e.g., what may be perceived to be) any 'depth' of the box. The technique in one embodiment includes, for example, a set of operations such as the following (in which the order may be different): 1. The system may associate two sets of four coordinates—one set for the 'top' of the box (e.g., the outer most corners of the image of the box, which represent the top edge corners of the box 'walls'), and one set for the bottom of the box (e.g., the inner corners of the image of the box, which represent the bottom edge corners of the box 'walls'); 2. For any given perceived depth (for example, the appearance of the image at a 70% depth between the top of the box and the bottom of the box as viewed from a top perspective), the system is configured to find the point for each corner which correctly reflects the desired distance from the top and bottom of the box, e.g., by applying a weighted average between top and the bottom coordinates; 3. The system may then apply the stretch transformation to all four resulting coordinates. The resulting four coordinates are the bounding box for placing the object at the correct visual depth, as shown for example in FIG. 8. In some embodiments, the box may then be displayed or redisplayed in its altered or recomputed form to the user.

In accordance with further embodiments, the system may be configured to provide for manipulation to accommodate more than one graphical image or object. The system may create a box of any desired dimensions and fit any screen, container, or device programmatically. In some embodiments, because the dimensions and the number of images may be unknown to the system ahead of time, a number of possible options are available. In some embodiments, predetermined templates for any number of products may be implemented, and the templates determine placement and arrangement of images.

In some embodiments, the system may be configured to implement templates, for example by implementing a set of operations such as the following (in which the order may be different): 1. for each number of input products (1, 2, 3, 4, 5 . . . etc.), the system may have a set of pre-designed templates; 2. A 'template' in this case may be a predetermined division of the box into compartments—including each compartment location, and/or dimension(s); 3. When the box is stretched/resized, the compartments may be stretched proportionally—by the system calculating each compartment size and dimension, and applying stretch coefficients (which the box already calculated as described herein) to each; 4. Given an input number of products, the system may be configured to choose a 'default' pre-programmed template—for example, for three products, the template may, for example, call for one larger compartment for the first product and two smaller ones underneath for the remaining two products; 5. The system may allow the user to change the template, allowing a different layout and location of the compartments and products; 6. Once the template is chosen—for example by the system as a default or by user, the system may render all product images—each within each compartment: (i) The images may be centered vertically and/or horizontally in each compartment, also applying the margin from the design (for example, 10 pixels in each direction); and (ii) The centering may be done for example by retrieving the dimensions of each compartment, and dimensions of each input image, and calculating the target size of the image to fit into the compartments (regular 'size-to-fit' calculation), e.g., sizing it by applying width and height attributes, then positioning it using the IMG element top, and left attributes within the compartment.

In some embodiments a packing algorithm (e.g., Bin Packing, First Fit Decreasing, etc.) may be implemented, e.g., using a Bin Packing, First Fit Decreasing approach, and implementing a set of operations such as the following (in which the order may be different): 1. Each compartment size and/or position may be calculated for example using one of the known 'packing' algorithms (e.g., near-optimal bin packing algorithm, etc.) or by other methods; and 2. Once each compartment size and/or position is determined, 'pack' each IMG element within the compartment using the techniques described herein. However, these first two options (templates and packing algorithms) may require either a large set of pre-made templates, or complicated packing algorithms.

Therefore, in yet other embodiments, a Bento Box algorithm may be implemented which essentially may first divide the container box into a number of compartments based on the number of images (graphical objects) that need to be placed. Then, each image may be scaled and centered by the system to fit in the appropriate compartment.

In accordance with some embodiments of the invention, the bento box algorithm may be implemented by the system, for example as follows (as with other methods described herein, other operations or sequences of operations may be used). Given the number of items/products to 'pack'—nItems, the system may implement the following: 1. Calculate the number of items per row: var nItemsPerRow=ceil (sqrt(nItems)—by taking the square root of number of items and taking the closest higher integer; 2. Calculate number of items in the 'overflow' or irregular row var nItemsOverflowRow=nItems % nItemsPerRow; —By looking at modulo of dividing number of items by number of items in the row calculated in step 1; 3. Calculate the number of total rows by dividing number of total items by number of items per row: var nRows=ceil(nItems/nItemsPerRow); 4. Decide on (e.g., determine) the position of the 'irregular' or overflow row—if the total number of row is more than 2, then the irregular row is the last, otherwise it is first: var posOverflowRow=nRows>2 ? nRows−1:0; For example, for 3 items, the first row may have one item and the second row may have two items. For five items, the first row has three items (regular) and the second row may have two items; 5. Once the system knows how many rows, it may divide or partition the box, e.g., equally into rows vertically. Each row may have the same height, and total heights of all rows is the size of the inner part of the box: var rows=box.divideEquallyIntoRows(nRows); 6. For each row, divide it equally into the number of items in that row—either number of items per row or number of items per irregular row; for example, in one example implementation (the sample code segments provided herein are examples only, and other languages or code segments may be used):

```
for (iRow=0; iRow<nRows; iRow++) {
  var      nCells=(nItemsOverFlowRow>0)      &&
(posOverFlowRow==iRow) ?
  nItemsOverFlowRow: nItemsPerRow;
  var cells=rows[iRow].divideIntoCells(nCells);
}
```

And 7. For each compartment in each row, place the image into the compartment, e.g., using techniques outlined herein; for example in one example implementation:

```
for (iProduct=0; iProduct<nProducts; iProducts++) {
  cell.placeInto(products[iProduct]);
}
```

As with other methods described herein, specific code is provided as an example, and other code and other sequences of operations may be used.

An exemplary algorithm to divide or partition the container box into compartments and place images inside each is as follows; other specific code, other operations, and other languages may be used:

```
varnItemsPerRow = ceil(sqrt(nItems));
varnItemsOverflowRow = nItems % nItemsPerRow;
varnRows = ceil(nItems/nItemsPerRow);
varposOverflowRow = nRows> 2 ? nRows-1 : 0;
var rows = box.divideEquallyIntoRows(nRows);
for (iRow = 0; iRow<nRows; iRow++) {
  varnCells = (nItemsOverFlowRow> 0) && (posOverFlowRow ==
iRow) ?
nItemsOverFlowRow :nItemsPerRow;
  var cells = rows[iRow].divideIntoCells(nCells);
}
for (iProduct = 0; iProduct<nProducts; iProducts++) {
  cell.placeInto(products[iProduct]);
}
```

In some embodiments, an algorithm according to one embodiment may include creating compartment separators. In some embodiments, without separators, each image may be centered in its compartment, but because the user cannot see the compartments and only sees the images, and each image might have different dimensions, to the user the images may look misaligned and unorganized. Therefore, in some embodiments, the system may be configured to add separators, e.g., to clearly show that for each compartment, each image appears neatly centered within its compartment.

Figure 10:
FIG. 10 is an example of box generated using a combination of stretching and dividing an original box according to at least one embodiment of the invention.

The results may be seen, for example, in examples shown in FIGS. 9A-E. Likewise, another example of the result of a combination of stretching and partitioning and dividing the original box may be seen in FIG. 10. It should be noted that in some embodiments, the processor may be further configured to enable interactivity by a user with respect to the automated features described herein. For example, a user (e.g., a gift-sender or gift-recipient) may interact with various objects within the frame—e.g., zoom, re-order, click or hover over to retrieve/receive more information, remove, rotate, etc. Furthermore, the processor may enable a user to organize/reorganize the order/location or graphical objects, adjust the aspect ratios and/or sizes of visual frames and/or graphical objects, add/remove/adjust partitions, etc.

There are various ways in which a bento algorithm according to embodiments of the invention may be implemented by the system in order to divide the box. For example, the system may implement code in which the box grows to accommodate additional products/gifts, and/or the compartments may have different sizes according to additional external considerations—e.g., the importance of the product may influence the compartment size, etc.

In some embodiments a template may dictate the proportions of the box, given the input number of products, and then the system may implement a bento algorithm according an embodiment of the invention accordingly, for example, as follows: One product—square box; Two products—rectangular box, two products side by side; Three products—rectangular box, three products side by side; Four products—square box, 2×2 matrix of products, etc. Then, given the input products the correct box proportions may be chosen or calculated by the system (for example 1:1 for square with one product, 1:2 for two products, 1:3 for three, 1:1 for four etc.). Then, the box may be resized-to-fit (e.g. its dimensions may be re-calculated) the container without changing its aspect ratio (using for example a known resize-to-fit algorithm). Then, in some embodiments the box may be partitioned or divided into compartments, e.g., using one of the embodiments described herein, and the images may be packed inside each compartment.

In some implementations, first the box size may be determined as described herein. Then the compartments may be determined or calculated—their number may be, e.g., the number of products to be placed within the box. In some embodiments, the size of each compartment may be determined or calculated by the box size and not the image sizes, or vice-versa. Once the box is divided into compartments, in some embodiments each image may be placed into the corresponding compartment by resizing it and/or centering it to fit (possibly with some padding/margins)—using, e.g., JavaScript code logic.

In some embodiments, for resizing and centering to fit, the system may know the dimensions of each compartment—which may be calculated, for example, by applying a packing algorithm as described herein. Once the dimensions of the compartment are calculated, the image may be resized using a size-to-fit algorithm within the compartment. Then margins may be added, which may be for example constant (e.g., 10 pixels in each direction) or a percentage (e.g., 3% of width and height). Then the image may be placed using dimensions and position—e.g., centering in both directions and applying correct margins. In order to instruct the element to be sized and positioned correctly, in some embodiments the system using, e.g., JavaScript code, may apply attributes such as top, left, width, and/or height to the element, at which point the browser may position and/or size the element correctly.

Figure 11A:
FIGS. 11A-B show examples visual effects performed on the visual frame and/or graphical objects according to various embodiments of the invention.
Figure 11B:

In some embodiments, as seen in FIGS. 11A-B, other visual effects may also be performed on the visual frame and/or graphical objects, by executing in the processor, for example, effects module 134. If, for example, each image is just superimposed onto the box, in some embodiments the image may not always look natural, thus additional steps and techniques may be implemented, such as, for example implementing a set of operations such as the following (in which the order may be different): 1. Each image may have a drop shadow effect that makes it look slightly three-dimensional. (Drop shadow algorithms may be used in casting shadows off block-level elements.); 2. Each image may be overlaid with a special layer that darkens it a bit and makes the fit more natural; 3. Each image may be overlaid with a shadow layer that makes it part of the 3D box and part of the scene.

In other embodiments, additional effects and shadows may also be generated by the system using code executed processor 115, to provide further enhancement. For example, the box may be visualized in some embodiments as though it has three-dimensional walls that cast shadows on top of anything placed in the box. In order to achieve the same effect, the following technique may be implemented in accordance with some embodiments of the invention, implementing a set of operations such as the following (in which the order may be different): 1. The system may separate the box into two or more layers—for example, a base box layer with no shadows or effects, and a shadow layer; 2. In order to create a realistically looking box with dynamically placed assets, photos, media etc., the system may render a base box image, then place images and other objects (with their corresponding effects) in the box; 3 Finally, the system may place the shadow layer on top. This may allow the system to create multiple types of effects as described herein, with the outcome looking relatively realistic.

Figure 13:
FIG. 13 shows the resulting image of the example simulation of FIGS. 12A-C according to at least one embodiment of the invention.

As seen in FIGS. 12A-C, in some embodiments, the system may simulate the internal surface of a box. For example, the bottom and sides of a box may have a textured, patterned or colorful treatment, e.g., with the treatment being completely dynamic and/or rendered by the system programmatically in HTML/CSS/JS. This may be achieved by the system in accordance with various embodiments of the invention, e.g., by placing in the display (from bottom to top, layered one over the next): 1. A base box layer (see FIG. 12A); 2. A semi-transparent box internal surface layer (which may be, for example, a picture, pattern, color etc.) (see FIG. 12B); and 3. a shadow layer (see FIG. 12C). An example of the result of such an effect (e.g., combining base box+internal surface image+shadow layers) may be seen in FIG. 13.

Figure 14:
FIG. 14 shows an example rendering according to at least one embodiment of the invention.

In some embodiments, once the box has been rendered in the desired manner, graphical objects representing selected products may be added into the box. In some embodiments, any number (e.g., one or more) of graphical objects may be added by the system dynamically below the shadow layer and the outcome will look relatively realistic. For example, from bottom to top, layered one over the next, the layers may be placed as follows: 1. Base box layer; 2. Semi-transparent box internal surface layer (which may be a picture, pattern, color etc.); 3. Content objects such as images, digital greeting cards, video clips, etc.; and 4. The shadow layer. An example rendering may be seen in FIG. 14.

Figure 15:
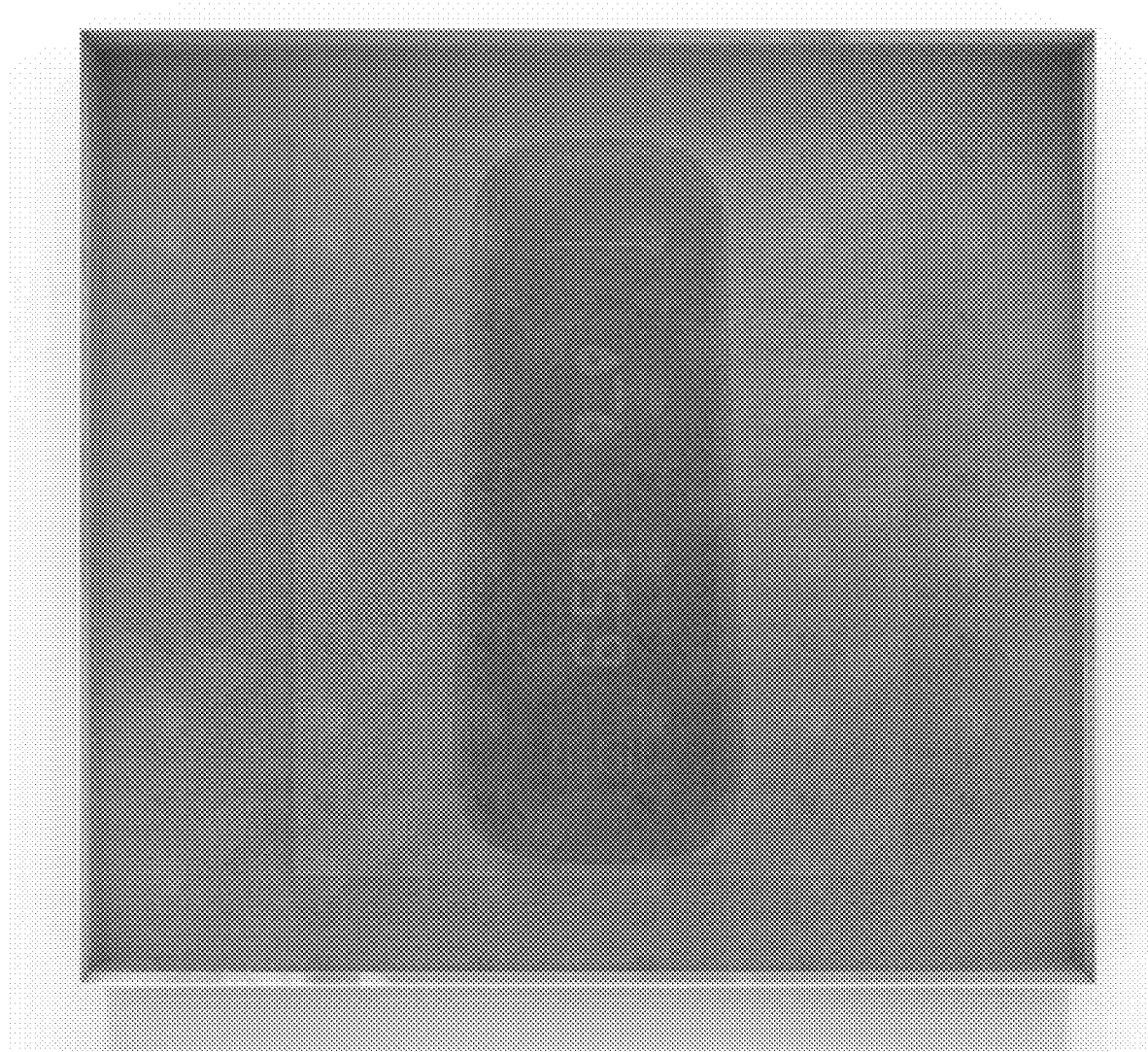
FIG. 15 shows an example rendering according to at least one embodiment of the invention.

In some embodiments, the system may create additional layers of content to be added to the box. For example, a digital representation of tissue paper may be included by the system as part of the content that may be added into the box. The tissue paper may have various textures, patterns or colors, and/or be semi-transparent, e.g., to reveal the items beneath. The system may be configured to place the tissue paper at various depths inside the box, for example, using the techniques and algorithms outlined herein regarding placement of objects inside the box. An example rendering may be seen in FIG. 15.

Figure 16:
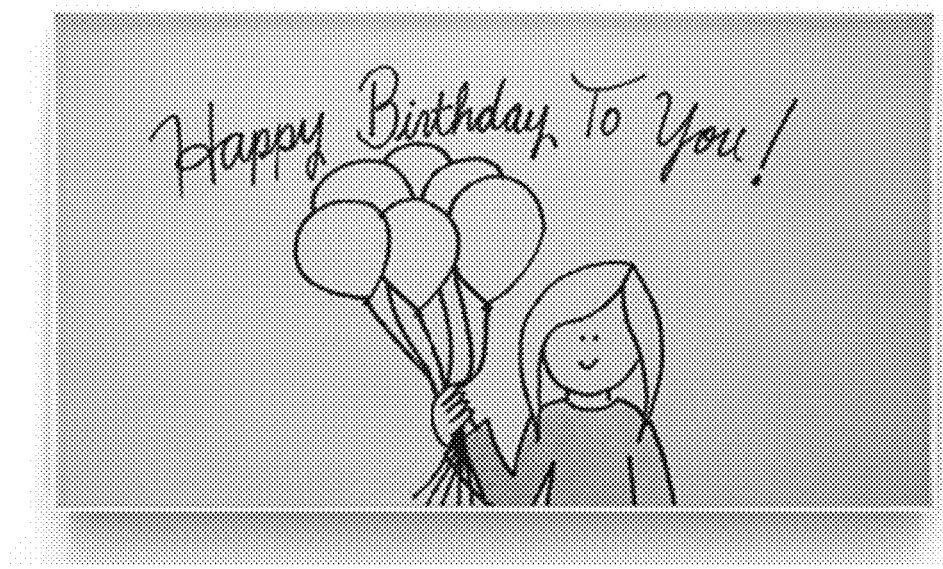
FIG. 16 shows an example rendering according to at least one embodiment of the invention.

In some embodiments, as may be seen in FIG. 16, although the box visualizes a 3D-like object, it may be presented with two-dimensional digital assets (objects) such as videos, greeting cards, backgrounds, and other additional digital media. In some embodiments, the assets may be perfectly positioned within the box and/or have all the effects applied in ways outlined herein, so the placement may look seamless.

Figure 17:
FIG. 17 shows an example rendering of customized box tops according to at least one embodiment of the invention.
Figure 18A:
FIGS. 18A-D show a seamless 3D gift box opening experience according to various embodiments of the invention.
Figure 18B:
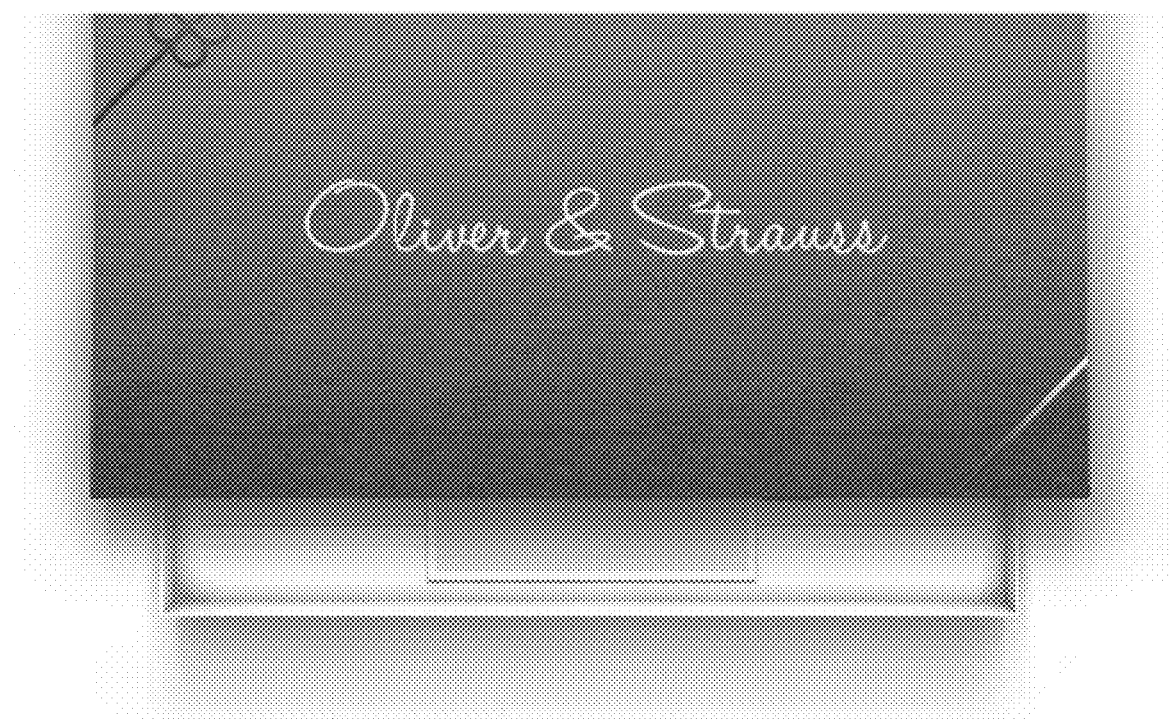
Figure 18C:
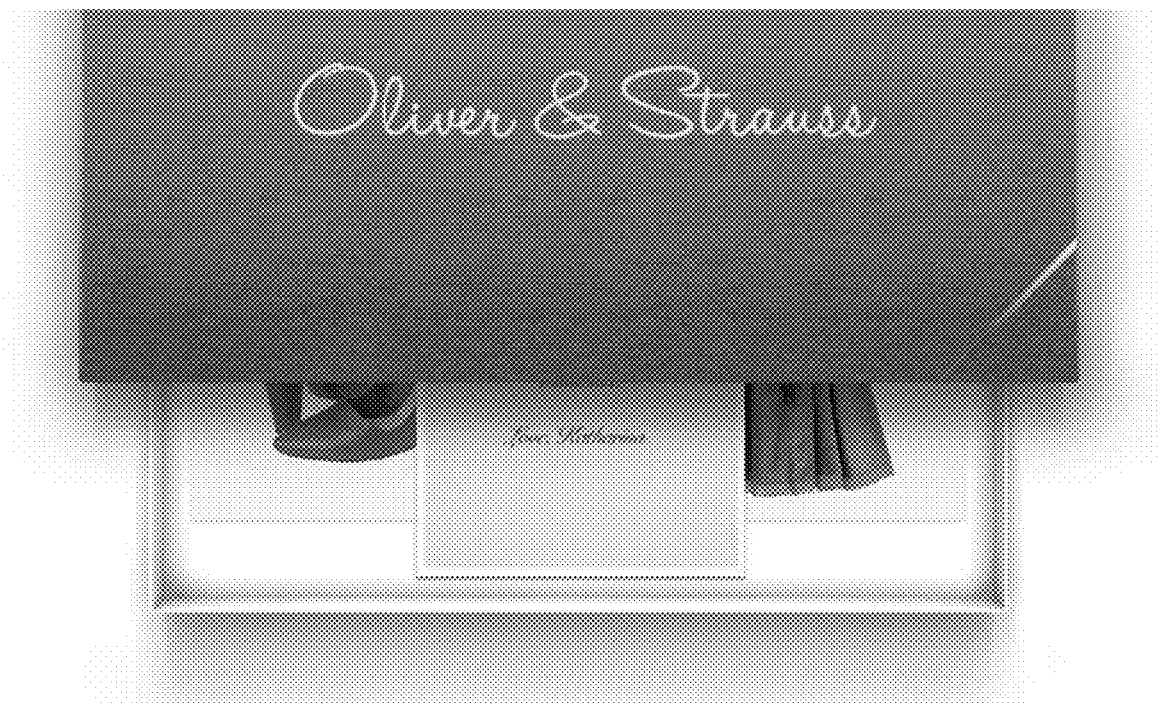
Figure 18D:
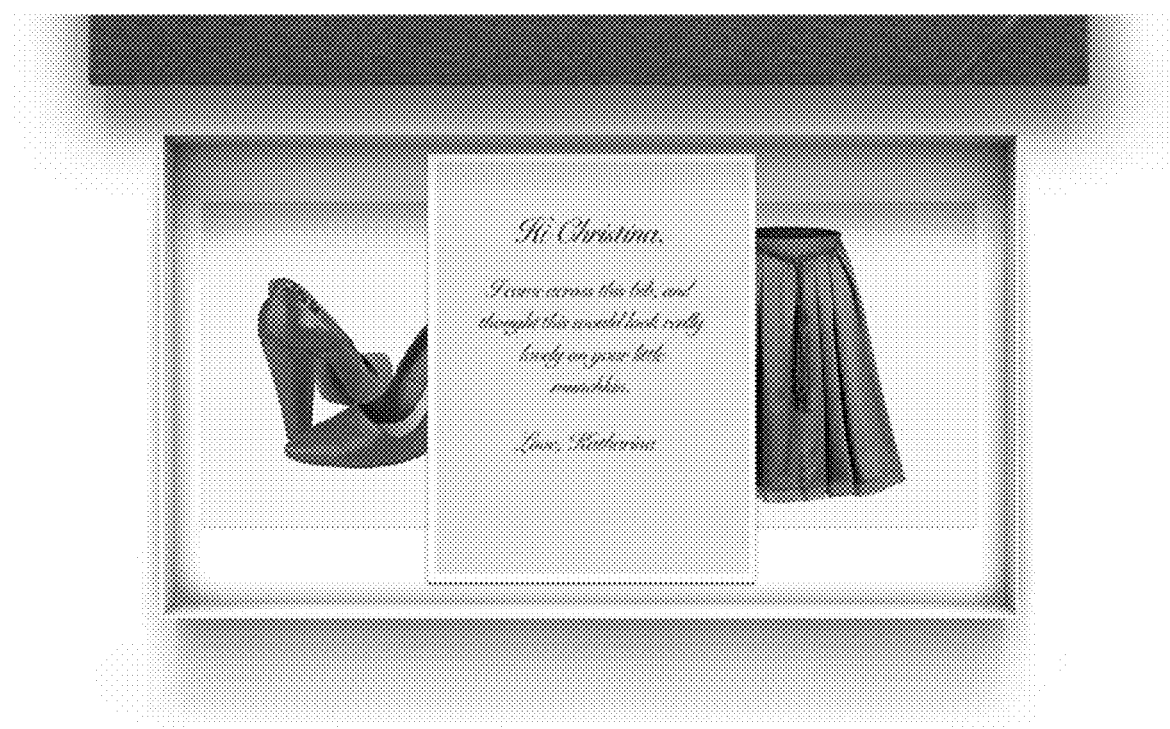

Furthermore, using similar techniques to those described herein, in some embodiments the system may be configured to generate an image of a box top or cover, which may be customized (e.g., with logos, ribbons, etc.) and dynamically rendered on top of the box, e.g., without needing to create custom images for each customization. Because the box may be visualized from the top view, the system may render the box top dynamically as well using a variety of programmatic techniques and languages such as HTML/CSS/JS, as described herein, adjusting the size to fit directly over a previously generated box, etc. In some embodiments, the box top may be stretched as describe herein to match the outer-most measurements of the box, so as to cover the box in its entirety. In some embodiments, box tops may have ribbons, store logos, patterns, colors, images etc. Examples of customized box tops may be seen in FIG. 17.

For embodiments in which a box top or cover is generated to cover the box, the system may be configured to provide animation reflecting the experience of uncovering (e.g., opening) the box. In some embodiments, using similar techniques to those described herein, a method for providing the box opening experience may to be implemented by the system programmatically (for example in HTML, CSS, or JavaScript). The system may provide the ability to visualize a 3D-like box opening experience using 2D objects. In some embodiments, the system may accomplish this by simulating a 3D transformation of the box cover using 2D transformations, implementing a set of operations such as the following (in which the order may be different): 1. lifting the box cover may be simulated, for example, using a zoom transformation, wherein the cover is made larger on the screen than its original rendering, giving the impression of being lifted. This may be implemented by the system using CSS transforms, for example; and 2. Moving the box cover in a predetermined direction (or manually manipulated direction) on the screen to uncover ("open") the box and reveal its contents may be achieved by the system using 2D movement (which may be accomplished, for example using HTML, CSS, or JavaScript). The combination of at least these two techniques may simulate a seamless 3D gift box opening experience, an example of which may be seen in FIGS. 18A-D.

Figure 19A:
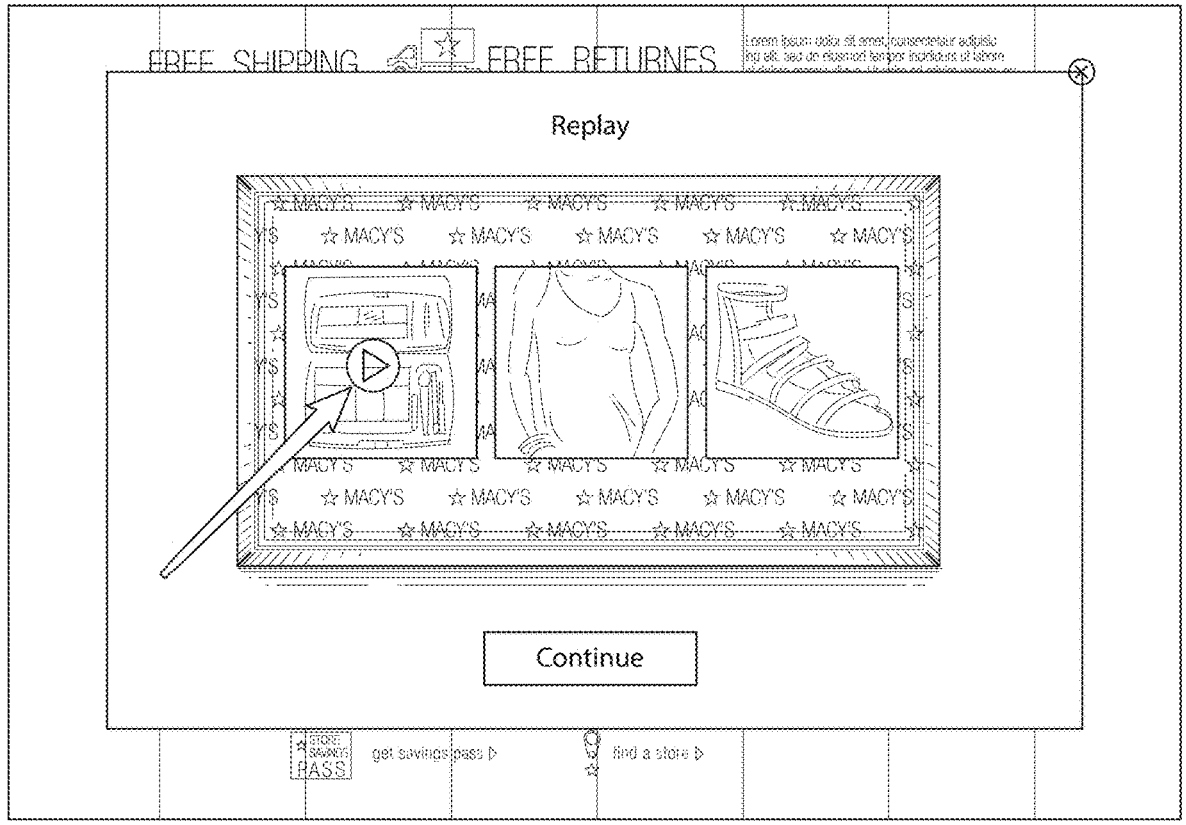
FIGS. 19A-C show various interactive elements according to various embodiments of the invention.
Figure 19B:
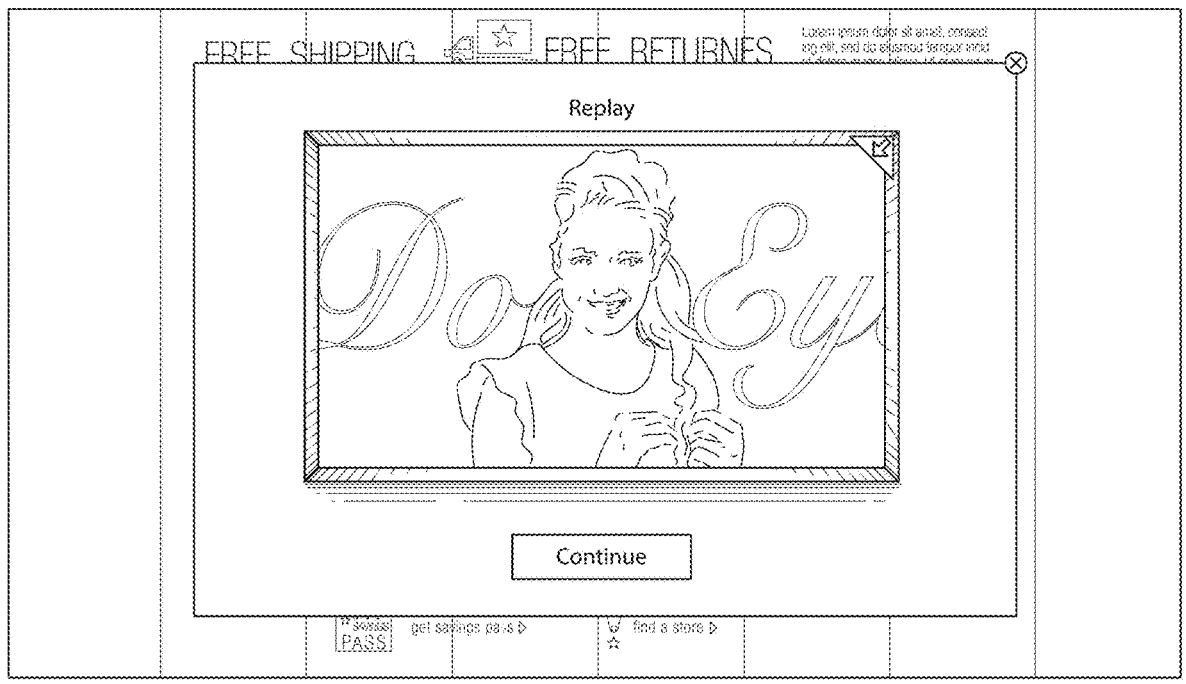
Figure 19C:
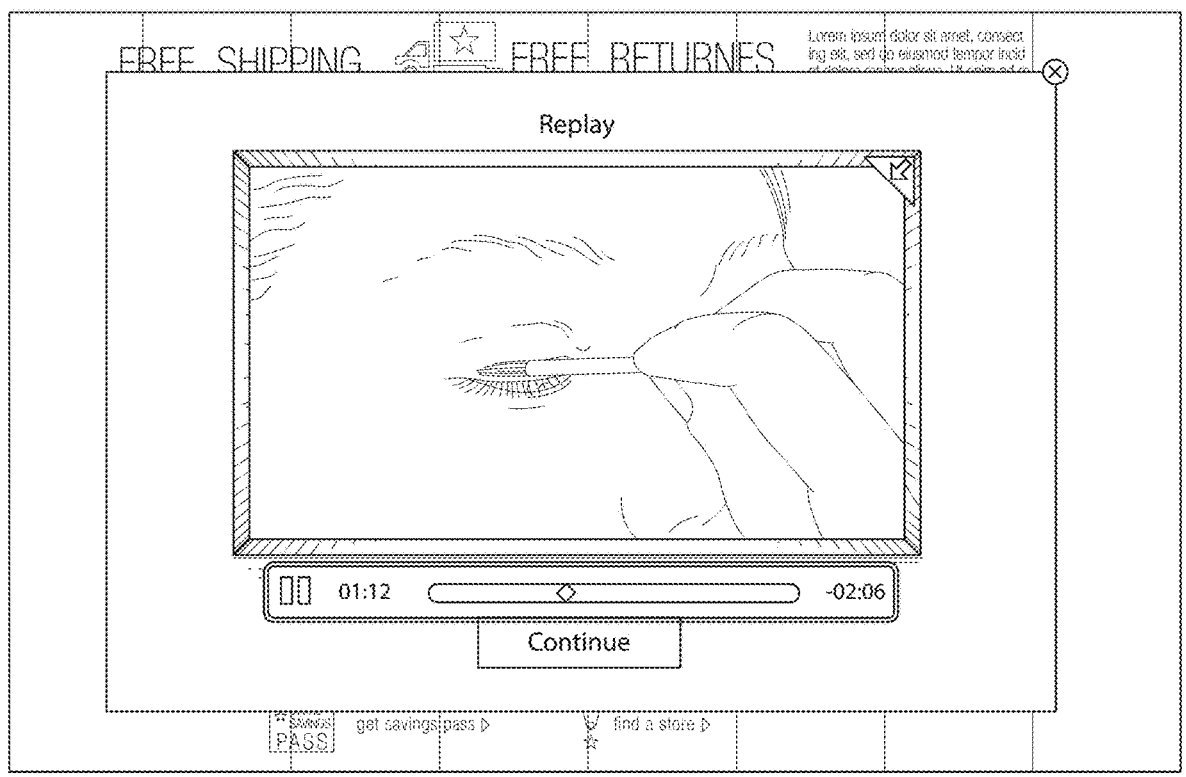

In accordance with further embodiments, the system may also be configured to generate certain elements of the box which may be interactive in nature, such as the product images and/or other content within the box. For example: 1. hovering over the products may show metadata for the product such as title, price, attributes etc.; 2. an 'X' or similar button may appear which may allow the sender to edit their gift box by removing some products (similar to e-commerce cart/bag functionality); 3 an 'edit' link may be present to allow users to edit items in their box—for example their quantity, color, size etc.; 4. a 'play' or similar button may be shown over a specific product, in which clicking on the play button may show product specific content, e.g., video, audio, images, info etc. The user may show or dismiss this related content and return to the 'product view' within the box. Examples of such system-generated user interactivity may be seen, for example, in FIGS. 19A-C.

Thus, the combination of inventive techniques described herein may allow, in various embodiments, a large variety of box designs, skinning, customization, personalization, placing any number of images, photos, videos, greetings and other objects or media inside the box, e.g., through use of basic assets and web programming techniques like HTML, CSS and JavaScript—without the need for complicated pre-rendering of various boxes and their designs and contents into images, and without the need to pre-rendering of any gift box opening/closing effects into video or animation files.

Although much of the description herein is directed to systems and methods for providing enhanced product visualization, the systems and methods disclosed herein may be similarly deployed and/or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for providing enhanced product visualization. The flowchart and block diagrams in the figures illustrate the architecture, functionality, and operation of possible implementations of systems, methods and computer program products according to various embodiments and arrangements. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions describe herein may be implemented by hardware and or hardware executing code (also known as programs, software, or software applications) which include machine instructions for a programmable processor, and may be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as server memory 125, computer-executable instructions such as modules 130 and a processor such as processor 115.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

While certain embodiments described herein are described as having a certain device such as a server or user computer perform certain functions, in other embodiments, other devices may perform such functions. For example, functions described as being performed on a server may be performed on a user, purchaser or receiver device. One or either of device processors 145 and/or server processor 115 may be configured to perform embodiments of the present invention by for example executing software or code. Modules described herein such as modules 131-135 may be executed by and thus may be one or more of processors 115 and/or 145.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network (LAN), a wide area network (WAN), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

The terminology used herein is for the purpose of describing particular embodiments only and is not intended to be limiting of the invention. As used herein, the singular forms "a," "an" and "the" are intended to include the plural forms as well, unless the context clearly indicates otherwise. Likewise, "a," "an," and "the" are intended to include "one or more" and/or "at least one," unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims

What is claimed is:

1. A computer-implemented method, comprising:
receiving, by one or more processors, input corresponding to a selection of a two-dimensional object, wherein the two-dimensional object is associated with a shape, and wherein the two-dimensional object includes a non-editable graphic;
determining a set of object dimensions for the two-dimensional object;
determining, based on the set of object dimensions for the two-dimensional object, a visual frame container, wherein the visual frame container represents a three-dimensional container, and wherein determining includes calculating a set of container dimensions for the visual frame container;
determining a set of optimized dimensions associated with a visual box, wherein the set of optimized dimensions are determined using an aspect ratio and the shape associated with the two-dimensional object;
determining a proportion between the calculated set of container dimensions for the visual frame container and the set of optimized dimensions associated with the visual box, wherein the proportion maximizes the display of the representation of the visual box within the visual frame container;
manipulating the set of object dimensions for the two-dimensional object, wherein manipulating includes resizing the two-dimensional object according to the set of optimized dimensions associated with the visual box, such that the two-dimensional object will fit within the visual box;
automatically generating a semi-transparent layer, wherein the semi-transparent layer modifies an appearance of the two-dimensional object; and
automatically causing the two-dimensional object and the semi-transparent layer to be displayed within the visual box, wherein the two-dimensional object appears placed at a depth within the visual box within the visual frame container.

2. The computer-implemented method of claim 1, wherein the visual box is a visual frame.

3. The computer-implemented method of claim 1, wherein the set of container dimensions or the set of object dimensions include a height value and a width value.

4. The computer-implemented method of claim 1, wherein manipulating the set of object dimensions includes increasing or decreasing a value from the set of object dimensions.

5. The computer-implemented method of claim 1, wherein manipulating the set of object dimensions for the two-dimensional object includes resizing the two-dimensional object horizontally or vertically.

6. The computer-implemented method of claim 1, wherein causing the two-dimensional object to be displayed within the visual box includes superimposing the two-dimensional object onto the visual box.

7. The computer-implemented method of claim 1, further comprising:
causing the semi-transparent layer to be displayed over the two-dimensional object.

8. The computer-implemented method of claim 1, wherein the semi-transparent layer includes a representation of one or more shadows, and wherein the representation of one or more shadows corresponds to one or more shadows of the visual frame container.

9. The computer-implemented method of claim 1, further comprising:
receiving input corresponding to a selection of another two-dimensional object, wherein manipulating the set of container dimensions further includes accommodating the other two-dimensional object.

10. The computer-implemented method of claim 9, further comprising:
determining an arrangement for the two-dimensional object and the other two-dimensional object.

11. The computer-implemented method of claim 1, further comprising:
generating an additional semi-transparent layer, wherein the additional semi-transparent layer modifies a different appearance of the two-dimensional object.

12. The computer-implemented method of claim 1, further comprising:
generating an additional layer; and
causing the additional layer to be displayed between the two-dimensional object and the visual frame container.

13. The computer-implemented method of claim 1, further comprising:
determining an amount of products; and
using a template to render the amount of products.

14. The computer-implemented method of claim 1, further comprising:
determining an amount of products; and
determining a layout corresponding to the amount of products.

15. A network device, comprising:
one or more processors; and
a non-transitory computer-readable medium including instructions that, when executed by the one or more processors, cause the one or more processors to perform operations including:
receiving, by one or more processors, input corresponding to a selection of a two-dimensional object, wherein the two-dimensional object is associated with a shape, and wherein the two-dimensional object includes a non-editable graphic;
determining a set of object dimensions for the two-dimensional object;
determining, based on the set of object dimensions for the two-dimensional object, a visual frame container, wherein the visual frame container represents a three-dimensional container, and wherein determining includes calculating a set of container dimensions for the visual frame container;
determining a set of optimized dimensions associated with a visual box, wherein the set of optimized dimensions are determined using an aspect ratio and the shape associated with the two-dimensional object;
determining a proportion between the calculated set of container dimensions for the visual frame container and the set of optimized dimensions associated with the visual box, wherein the proportion maximizes the display of the representation of the visual box within the visual frame container;

manipulating the set of object dimensions for the two-dimensional object, wherein manipulating includes resizing the two-dimensional object according to the set of optimized dimensions associated with the visual box, such that the two-dimensional object will fit within the visual box;

automatically generating a semi-transparent layer, wherein the semi-transparent layer modifies an appearance of the two-dimensional object; and automatically causing the two-dimensional object and the semi-transparent layer to be displayed within the visual box, wherein the two-dimensional object appears placed at a depth within the visual box within the visual frame container.

16. The network device of claim 15, wherein the set of container dimensions or the set of object dimensions include a height value and a width value.

17. The network device of claim 15, wherein the instructions for manipulating the set of object dimensions include instructions for increasing or decreasing a value from the set of object dimensions.

18. The network device of claim 15, wherein the instructions for manipulating the set of object dimensions for the two-dimensional object include instructions for resizing the two-dimensional object horizontally or vertically.

19. The network device of claim 15, wherein the instructions for causing the two-dimensional object to be displayed within the visual box include instructions for superimposing the two-dimensional object onto the visual box.

20. The network device of claim 15, wherein the the visual box is a visual frame.

21. The network device of claim 15, wherein the non-transitory computer-readable medium further comprises instructions that, when executed by the one or more processors, cause the one or more processors to perform operations including:

causing the semi-transparent layer to be displayed over the two-dimensional object.

22. The network device of claim 15, wherein the semi-transparent layer includes a representation of one or more shadows, and wherein the representation of the one or more shadows corresponds to one or more shadows of the visual frame container.

23. The network device of claim 15, wherein the non-transitory computer-readable medium further comprises instructions that, when executed by the one or more processors, cause the one or more processors to perform operations including:

generating an additional semi-transparent layer, wherein the additional semi-transparent layer modifies a different appearance of the two-dimensional object.

24. The network device of claim 15, wherein the non-transitory computer-readable medium further comprises instructions that, when executed by the one or more processors, cause the one or more processors to perform operations including:

receiving input corresponding to a selection of another two-dimensional object, wherein manipulating the set of container dimensions further includes accommodating the other two-dimensional object.

25. The network device of claim 24, wherein the non-transitory computer-readable medium further comprises instructions that, when executed by the one or more processors, cause the one or more processors to perform operations including:

determining an arrangement for the two-dimensional object and the other two-dimensional object.

26. The network device of claim 15, wherein the non-transitory computer-readable medium further includes instructions that, when executed by the one or more processors, cause the one or more processors to perform operations including:

generating an additional layer; and causing the additional layer to be displayed between the two-dimensional object and the visual frame container.

27. The network device of claim 15, wherein the non-transitory computer-readable medium further includes instructions that, when executed by the one or more processors, cause the one or more processors to perform operations including:

determining an amount of products; and using a template to render the amount of products.

28. The network device of claim 15, wherein the non-transitory computer-readable medium further includes instructions that, when executed by the one or more processors, cause the one or more processors to perform operations including:

determining an amount of products; and determining a layout corresponding to the amount of products.

29. A computer-program product tangibly embodied in a non-transitory machine-readable storage medium, including instructions that, when executed by one or more processors, cause the one or more processors to:

receive, by one or more processors, input corresponding to a selection of a two-dimensional object, wherein the two-dimensional object is associated with a shape, and wherein the two-dimensional object includes a non-editable graphic;

determine a set of object dimensions for the two-dimensional object;

determine, based on the set of object dimensions for the two-dimensional object, a visual frame container, wherein the visual frame container represents of a three-dimensional container, and wherein determining includes calculating a set of container dimensions for the visual frame container;

determine a set of optimized dimensions associated with a visual box, wherein the set of optimized dimensions are determined using an aspect ratio and the shape associated with the two-dimensional object;

determine a proportion between the calculated set of container dimensions for the visual frame container and the set of optimized dimensions associated with the visual box, wherein the proportion maximizes the display of the representation of the visual box within the visual frame container;

manipulate the set of object dimensions for the two-dimensional object, wherein manipulating includes resizing the two-dimensional object according to the set of optimized dimensions associated with the visual box, such that the two-dimensional object will fit within the visual box;

automatically generate a semi-transparent layer, wherein the semi-transparent layer modifies an appearance of the two-dimensional object; and automatically cause the two-dimensional object and the semi-transparent layer to be displayed within the visual box, wherein the two-dimensional object appears placed at a depth within the visual box within the visual frame container.

30. The computer-program product of claim 29, wherein the instructions for manipulating the set of object dimensions for the two-dimensional object include instructions for increasing or decreasing a value from the set of object dimensions for the two-dimensional object.

31. The computer-program product of claim 29, wherein the instructions for manipulating the set of object dimensions for the two-dimensional object include instructions for resizing the representation of the two-dimensional object horizontally or vertically.

32. The computer-program product of claim 29, wherein the instructions for causing the two-dimensional object to be displayed within the visual box include instructions for superimposing the two-dimensional object onto the visual box.

33. The computer-program product of claim 29, wherein the visual box is a visual frame.

34. The computer-program product of claim 29, wherein the set of container dimensions or the set of object dimensions include a height value and a width value.

35. The computer-program product of claim 29, further comprising instructions that, when executed by one or more processors, cause the one or more processors to:
   cause the semi-transparent layer to be displayed over the two-dimensional object.

36. The computer-program product of claim 29, wherein the semi-transparent layer includes a representation of shadows, and wherein the representation of the one or more shadows corresponds to one or more shadows of the visual frame container.

37. The computer-program product of claim 29, further comprising instructions that, when executed by one or more processors, cause the one or more processors to:
   generate an additional semi-transparent layer, wherein the additional semi-transparent layer modifies a different appearance of the two-dimensional object.

38. The computer-program product of claim 29, further comprising instructions that, when executed by one or more processors, cause the one or more processors to:
   receive input corresponding to a selection of another two-dimensional object, wherein manipulating the set of container dimensions further includes accommodating the other two-dimensional object.

39. The computer-program product of claim 38, further comprising instructions that, when executed by one or more processors, cause the one or more processors to:
   determine an arrangement for the two-dimensional object and the other two-dimensional object.

40. The computer-program product of claim 29, further comprising instructions that, when executed by the one or more processors, cause the one or more processors to:
   generate an additional layer; and
   cause the additional layer to be displayed between the two-dimensional object and the visual frame container.

41. The computer-program product of claim 29, further comprising instructions that, when executed by the one or more processors, cause the one or more processors to:
   determine an amount of products; and
   use a template to render the amount of products.

42. The computer-program product of claim 29, further comprising instructions that, when executed by the one or more processors, cause the one or more processors to:
   determine an amount of products; and
   determine a layout corresponding to the amount of products.

* * * * *